United States Patent [19]

Beck et al.

[11] Patent Number: 4,480,047

[45] Date of Patent: Oct. 30, 1984

[54] HIGH PERFORMANCE CATALYSTS FOR CARBOMETALLIC OIL CONVERSION AND THEIR MANUFACTURING AND USE

[75] Inventors: H. Wayne Beck, Russell, Ky.; James D. Carruthers, Fairfield, Conn.; Edward B. Cornelius, Ashland, Ky.; Ronald A. Kmecak, Ashland, Ky.; Stephen M. Kovach, Ashland, Ky.; William P. Hettinger, Jr., Russell, Ky.

[73] Assignee: Ashland Oil, Inc., Ashland, Ky.

[21] Appl. No.: 483,061

[22] Filed: Apr. 7, 1983

[51] Int. Cl.³ .............................................. B01J 29/08
[52] U.S. Cl. ........................................ 502/65; 502/68; 502/79; 208/120
[58] Field of Search ................... 502/65, 67, 68, 73, 502/79

[56] References Cited

U.S. PATENT DOCUMENTS

| | | | |
|---|---|---|---|
| 2,840,530 | 6/1958 | Milliken, Jr. et al. | 502/80 |
| 3,449,265 | 6/1969 | Gladrow et al. | 208/120 X |
| 3,553,104 | 1/1971 | Stover et al. | 208/120 |
| 3,556,988 | 1/1971 | Stover et al. | 208/120 |
| 3,696,025 | 10/1972 | Chessmore et al. | 208/113 |
| 3,717,587 | 2/1973 | Hepner | 208/120 X |
| 3,790,471 | 2/1974 | Argauer et al. | 208/111 |
| 3,816,342 | 6/1974 | Plank et al. | 208/111 X |
| 3,867,308 | 2/1975 | Elliott, Jr. | 502/65 |
| 3,867,310 | 2/1975 | Elliott, Jr. et al. | 502/65 |
| 3,912,619 | 10/1975 | Magee, Jr. et al. | 208/120 |
| 3,930,987 | 1/1976 | Grand | 208/111 |
| 4,010,116 | 3/1977 | Secor et al. | 502/68 |
| 4,058,484 | 11/1977 | Alafandi et al. | 423/328 |
| 4,085,069 | 4/1978 | Alafandi et al. | 502/68 |
| 4,086,187 | 4/1978 | Lim et al. | 502/68 |
| 4,088,605 | 5/1978 | Rollmann | 502/69 |
| 4,100,108 | 7/1978 | Alafandi et al. | 502/65 |
| 4,142,995 | 3/1979 | Alafandi et al. | 502/65 |
| 4,144,194 | 3/1979 | Guidry | 502/68 |
| 4,148,713 | 4/1979 | Rollmann | 208/111 |
| 4,164,465 | 8/1979 | Gladrow | 208/120 |
| 4,192,778 | 3/1980 | Alafandi et al. | 502/65 |
| 4,198,319 | 4/1980 | Alafandi et al. | 502/9 |
| 4,199,556 | 4/1980 | Plank et al. | 423/329 |
| 4,203,869 | 5/1980 | Rollmann | 502/69 |
| 4,206,085 | 6/1980 | Lim et al. | 502/68 |
| 4,215,016 | 7/1980 | Alafandi et al. | 423/328 |
| 4,219,446 | 8/1980 | Kuehl et al. | 502/65 |
| 4,224,188 | 9/1980 | Alafandi et al. | 502/65 |
| 4,226,743 | 10/1980 | Seese et al. | 502/65 |
| 4,228,137 | 10/1980 | Taylor et al. | 423/118 |
| 4,234,457 | 11/1980 | Alafandi et al. | 502/65 |
| 4,237,031 | 12/1980 | Alafandi et al. | 502/65 |
| 4,239,654 | 12/1980 | Gladrow et al. | 208/120 |
| 4,246,138 | 1/1981 | Alafandi et al. | 502/65 |
| 4,252,684 | 2/1981 | Alafandi et al. | 502/68 |
| 4,253,989 | 3/1981 | Lim et al. | 502/68 |
| 4,259,210 | 3/1981 | Alafandi et al. | 502/65 |
| 4,263,174 | 4/1981 | Tu et al. | 208/120 X |
| 4,269,815 | 5/1981 | Lim et al. | 423/328 |
| 4,309,277 | 1/1982 | O'Hara et al. | 208/111 |
| 4,310,441 | 1/1982 | Alafandi et al. | 502/235 |
| 4,319,983 | 3/1982 | Yoo | 208/114 |
| 4,325,845 | 4/1982 | Lim et al. | 502/68 |
| 4,325,847 | 4/1982 | Lim et al. | 502/68 |
| 4,333,857 | 6/1982 | Lim et al. | 502/68 |
| 4,339,354 | 7/1982 | Gladrow et al. | 208/120 |
| 4,415,438 | 11/1983 | Dean et al. | 208/120 |

OTHER PUBLICATIONS

New Generation of FCC Catalyst, E. J. Demmel and J. D. Lim, API Proceedings, vol. 58, pp. 29-32, Apr., 1975, reprint 04-1979.

*Primary Examiner*—Delbert E. Gantz
*Assistant Examiner*—O. Chaudhuri
*Attorney, Agent, or Firm*—Richard C. Willson, Jr.; Stanley M. Welsh

[57] ABSTRACT

A catalyst nominally containing zeolite, preferably HY zeolite and/or ultrastable HY zeolite, clay, alumina and an acidic silica-alumina co-gel matrix. The zeolite is preferably partially exchanged with high La/Ce ratio solution in a wetting step, and rare earths are precipitated onto the matrix. The catalyst has high metals tolerance and is capable of cracking heavy reduced crude oils, producing higher LCO/slurry oil ratio.

31 Claims, 13 Drawing Figures

COKE vs. CONVERSION

REDUCED CRUDE CATALYST

* Zeolite may be added at all or any point asterisked.

EFFECT OF PORE VOLUME ON RCCDU GASOLINE YIELD

735 Tk. Feedstocks

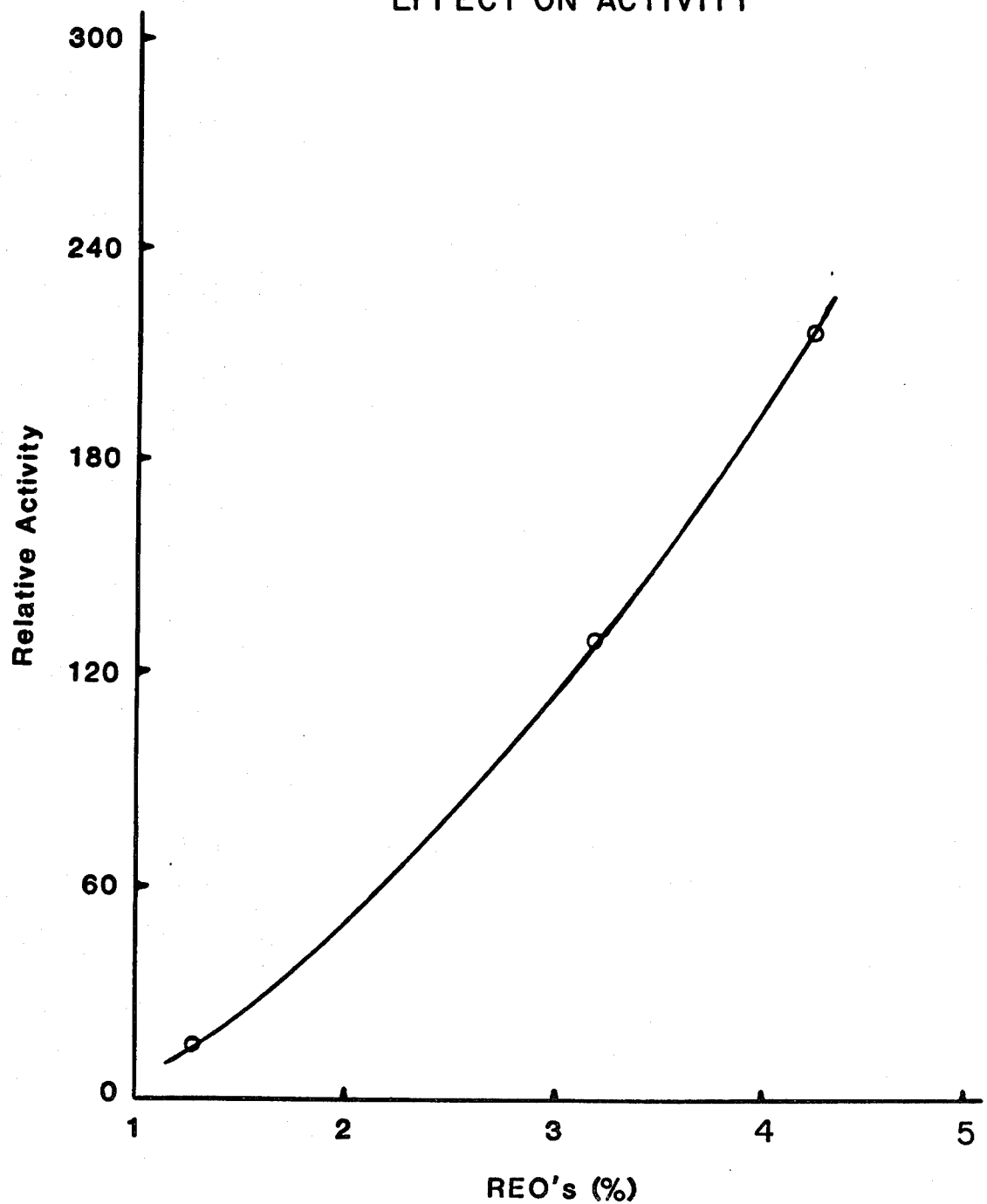

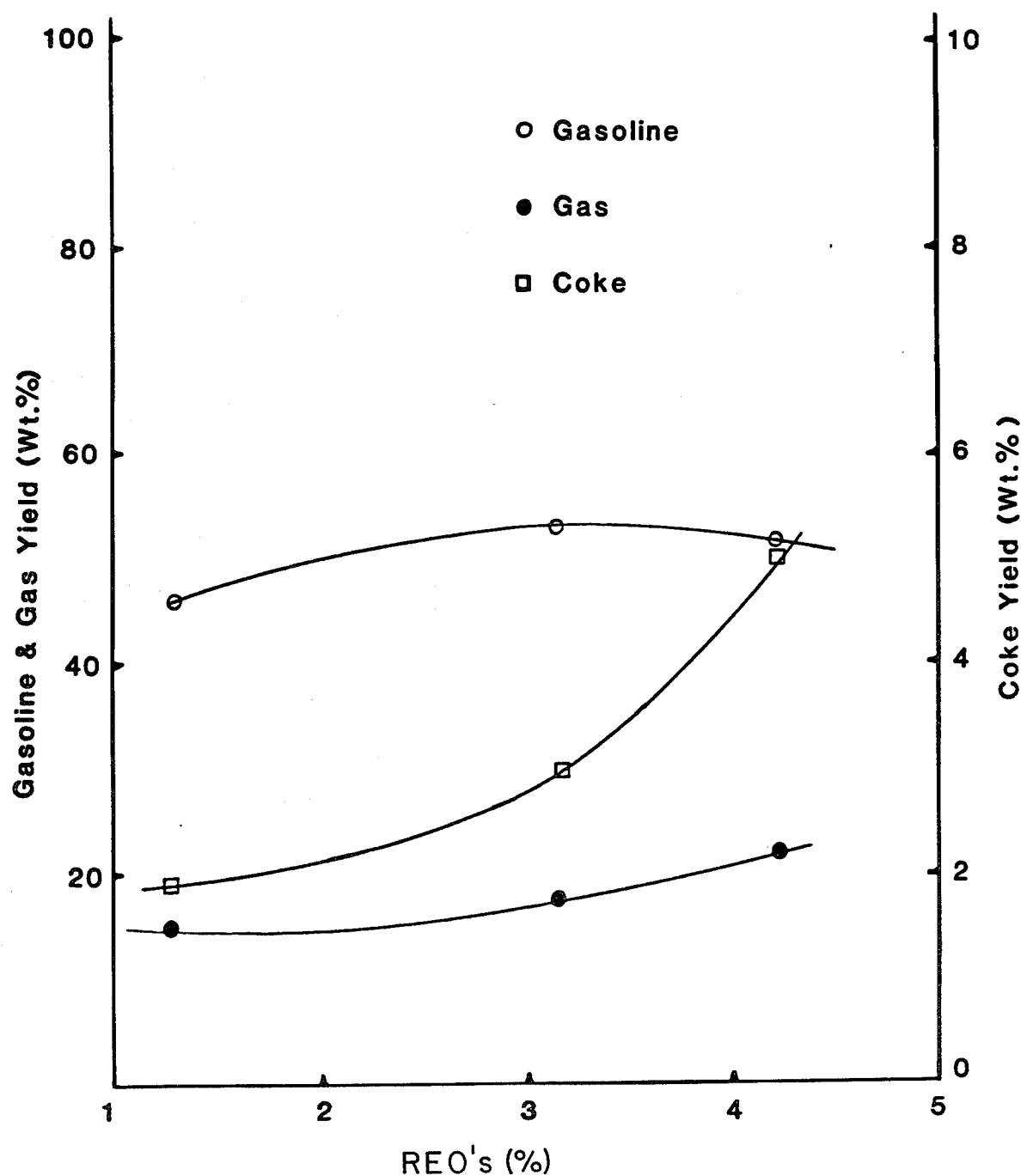

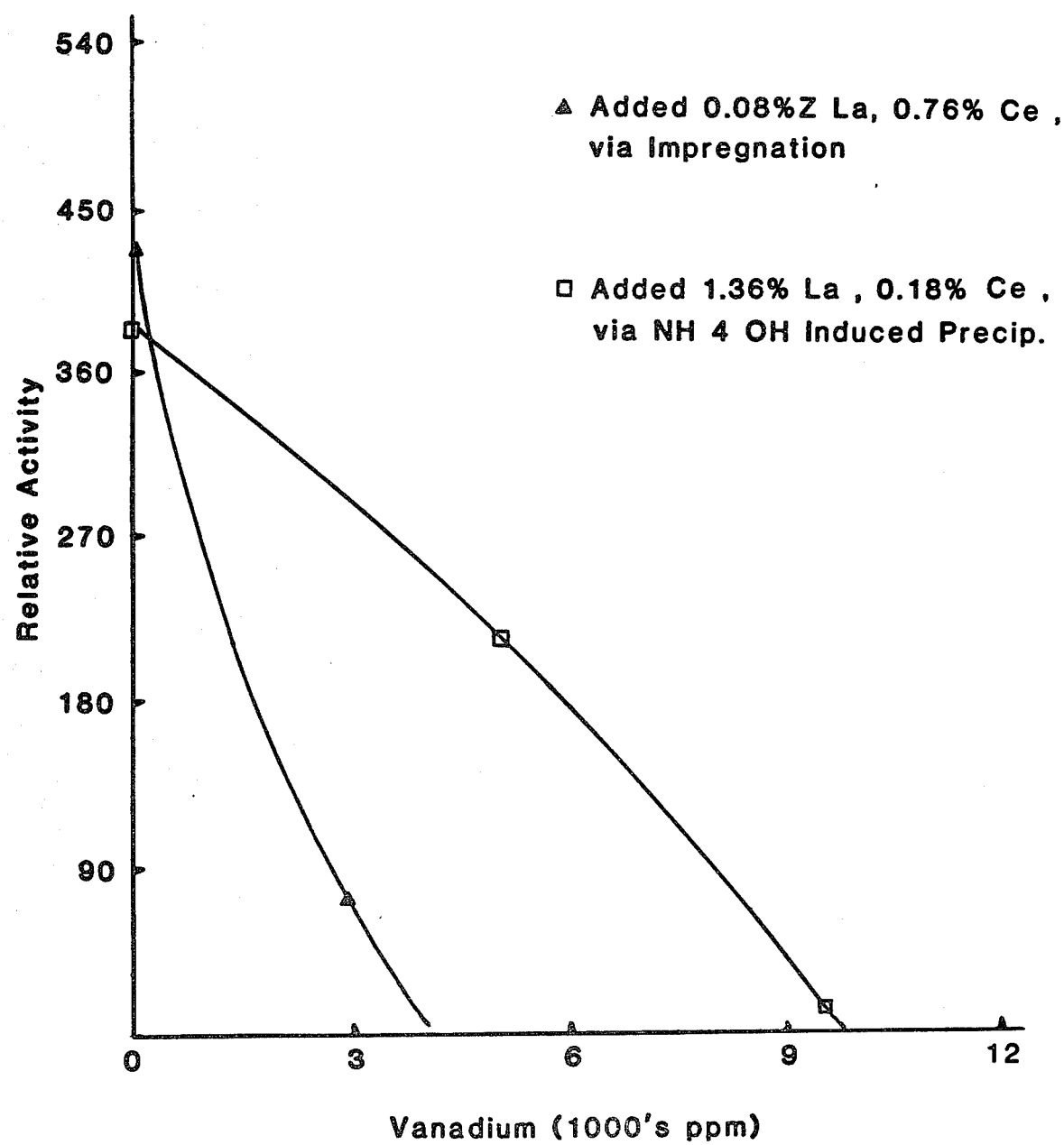

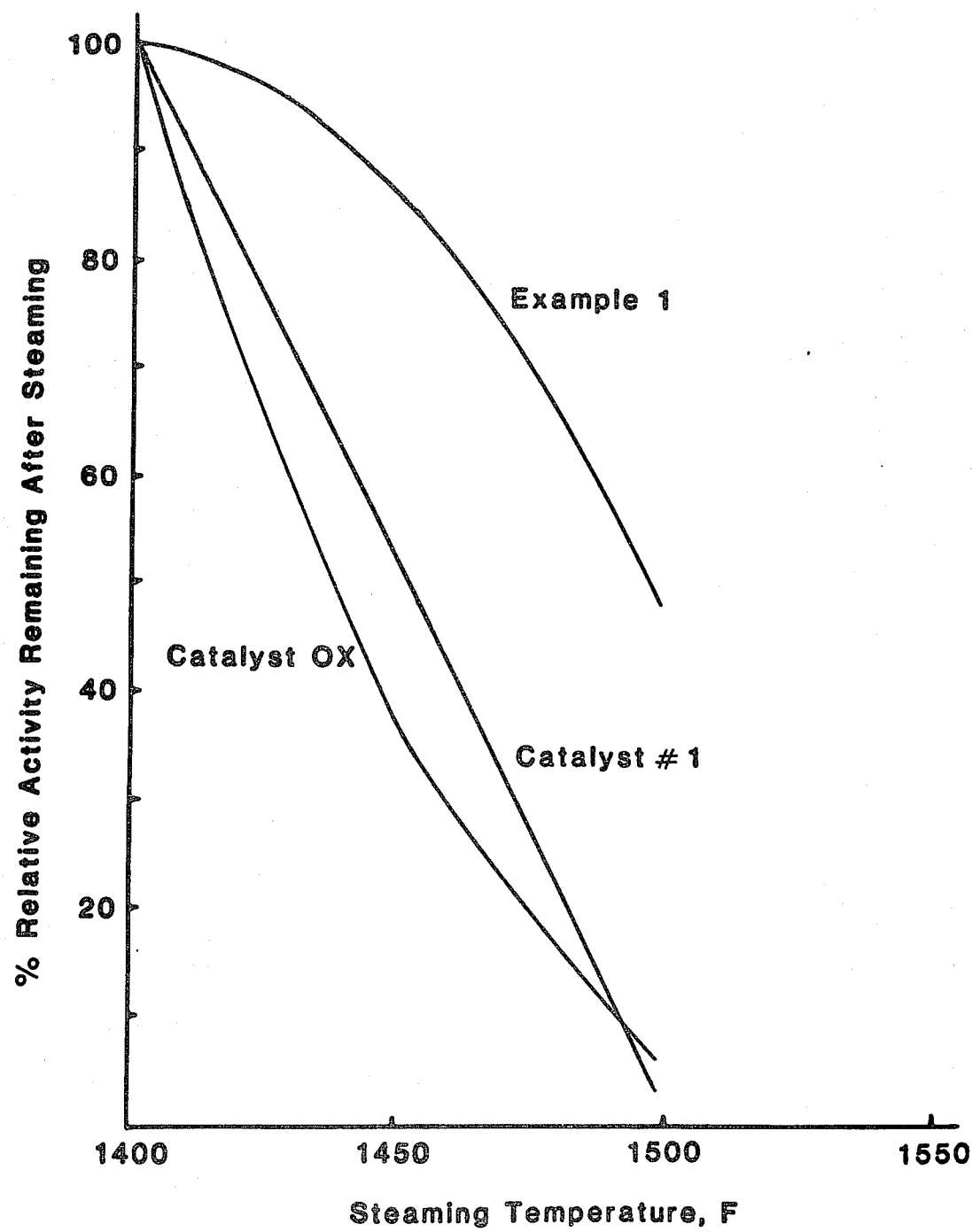

HIGH PERFORMANCE CATALYSTS FOR CARBOMETALLIC OIL CONVERSION AND THEIR MANUFACTURING AND USE

CROSS REFERENCES TO RELATED APPLICATIONS

The present invention relates to the general field of the following patent applications: U.S. Ser. No. 532,252, filed Sept. 15, 1983; U.S. Ser. No. 263,391, filed May 13, 1981, which has issued as U.S. Pat. No. 4,407,714; U.S, Ser. No. 507,864, filed June 27, 1983; U.S. Ser. No. 318,185, filed May 20, 1981, now abandoned; U.S. Ser. No. 263,398, filed May 13, 1981 which has issued as U.S. Pat. No. 4,374,019; U.S. Ser. No. 413,870, filed Sept. 2, 1982; U.S. Ser. No. 296,679, filed Aug. 27, 1981; and U.S. Ser. No. 252,967, filed Apr. 10, 1981, now abandoned. The techniques of U.S. Ser. No. 228,393, filed Jan. 26, 1981 (multi-stage regeneration) are also applicable to the invention.

BACKGROUND OF THE INVENTION (I) Field of the Invention

The present invention relates to the general field of catalysts and processes applicable to the conversion of hydrocarbons particularly the conversion of heavy oils contaminated with substantial amounts of metals and carbon e.g. reduced crudes.

In the evolution of catalytic cracking, the process has gradually evolved from a hardware standpoint, until it has reached its present state of develoment in fluid catalytic cracking of vacuum gas oils. However, some of the considerable advances in hardware have come about as a result of the introduction of new and very unique catalysts (namely the introduction of the zeolite catalyst which enabled the hardware to evolve to riser cracking with very short contact times).

Likewise, in reduced crude conversion of carbometallic oils, a process has been developed (Myers, Busch, U.S. Pat. No. 4,299,687) with all its attendant hardware, designed to facilitate the conversion of these high boiling residues into high octane gasoline with low capital investment and operating costs. However, it was fully appreciated that in order to realize the tremendous potential volume conversion to liquid transportation products existant in reduced crude, that highly selective catalysts would be required.

As pointed out in our letter to the editor of Science (reference 1980) it has been the intent of research to evolve a catalyst which could, in this process, utilize all the hydrogen and carbon in a most efficient manner. It was pointed out in that article that there is sufficient hydrogen available so as to convert all of reduced crude into a combination of toluene and pentenes in greater than 100 volume % yield, and with high octanes over 100, and that the only limiting factor to achieving such a result was the catalyst.

With that realization in mind, the inventors of this new catalyst have sought by very intensive research means to create a catalyst which, when harnessed with the unique features of the reduced crude conversion process, serve to obtain a yield of liquid transportation products previously not considered possible. In order to achieve this objective, it has been necessary that all aspects of catalytic conversion be considered and that all those properties required to reduce coke and hydrogen production, increase gasoline and light cycle oil yield, immobilize or reduce the effect of vanadia, inhibit the adverse effects of nickel, facilitate cracking in the presence of high molecular weight molecules so as to achieve cracking in the sieve, and also to operate in the presence of high molecular weight basic nitrogen compounds which tend to neutralize acid sites be optimized. In our invention, all of these features were concentrated on, and optimized, so as to produce a metal resistant, high performance catalyst to be harnessed with this new reduced crude conversion process.

(II) Description of the Prior Art

Because of the economic importance of the field of the present invention, a number of patent applications and technical publications have been addressed to the search for catalysts which will provide the most valuable product distribution while maintaining their activity and which are produceable at reasonable cost. The Assignee of the present application has itself directed substantial activity to the field of heavy oil conversion and its patents and pending applications include:

U.S. Pat. No. 4,341,624 to George D. Myers filed 11/14/79.

U.S. Pat. No. 4,347,122 to George D. Myers et al filed 11/14/79.

U.S. Pat. No. 4,299,687 to George D. Myers et al filed 11/14/79.

U.S. Pat. No. 4,354,923 to George D. Myers et al filed 11/14/79.

U.S. Pat. No. 4,332,673 to George D. Myers et al filed 11/14/79.

U.S. Ser. No. 06/296,679 to W. P. Hettinger, Jr. et al filed 8/27/81.

U.S. Ser. No. 06/263,391 to W. P. Hettinger, Jr. et al filed 5/13/81.

Filtrol Corporation patents and literature include:

| | | |
|---|---|---|
| U.S. Pat. No. 4,058,484 | Alafandi | $NH_4$ - faujasite |
| U.S. Pat. No. 4,085,069 | Alafandi | $NH_4$ - faujasite in a matrix |
| U.S. Pat. No. 4,086,187 | Lim | attrition resistant catalyst |
| U.S. Pat. No. 4,100,108 | Alafandi | 2 zeolites in matrix |
| U.S. Pat. No. 4,192,778 | Alafandi | RE exchanged faujasite |
| U.S. Pat. No. 4,198,319 | Alafandi | faujasite + Si—Al gel (50-70% $SiO_2$) + clay |
| U.S. Pat. No. 4,206,085 | Lim | faujasite + $Al_2O_3$ + silica sol |
| U.S. Pat. No. 4,215,016 | Alafandi | NaY + cations exchange at <500° F. under pressure |
| U.S. Pat. No. 4,234,457 | Alafandi | RE exchange of Si—AL matrix |
| U.S. Pat. No. 4,252,684 | Alafandi | RE exchange of Si—AL matrix |
| U.S. Pat. No. 4,224,188 | Alafandi | exchange of NaY with Al ion, then $NH_4$ ion |
| U.S. Pat. No. 4,228,137 | Taylor | produce faujasite by seeding with clay from halloysite |
| U.S. Pat. No. 4,237,031 | Alafandi | RE exchange of ammonium Si—Al matrix under temp-pressure |
| U.S. Pat. No. 4,246,138 | Alafandi | RE exchange of ammonium Si—Al matrix under temp-pressure |
| U.S. Pat. No. 4,259,210 | Alafandi | RE exchange of ammonium Si—Al matrix under temp-pressure |
| U.S. Pat. No. 4,142,995 | Alafandi | RE faujasite in Si—Al matrix |
| U.S. Pat. No. 4,253,989 | Lim | REY + Clay + $Al_2O_3$ + |

| | | -continued |
|---|---|---|
| U.S. Pat. No. 4,269,815 | Lim | 0.5-3.5% SiO$_2$ NaY - multiple exchange with NH$_4$ under temp-pressure |
| U.S. Pat. No. 4,310,441 | Alafandi | large pore Si—Al from cationic to anionic Al sources with 0.6 cc/g PV in 20-600 A range |
| U.S. Pat. No. 4,325,845 | Lim | zeolite in matrix (clay + silica gel from Na silicate) |
| U.S. Pat. No. 4,325,847 | Lim | zeolite in matrix (pseudoboehmite + alumina gel) |
| U.S. Pat. No. 4,333,857 | Lim | zeolite < 3 microns in matrix of pseudoboehmite, clay, silica sol |

Article
"New Generation of FCC Catalyst", E. J. Demmel and J. C. Lim, API Proceedings, Vol. 58, Pg. 29-32, April 1975, Reprint 04-79.

Mobil Oil Company's patents include:

| | | |
|---|---|---|
| U.S. Pat. No. 3,790,471 | Argaver | ZSM-5 |
| U.S. Pat. No. 4,088,605 | Rollman | ZSM-5 with an Al$_2$O$_3$ free outer shell |
| U.S. Pat. No. 4,148,713 | Rollman | ZSM-5 with an Al$_2$O$_3$ outer shell |
| U.S. Pat. No. 4,203,869 | Rollman | ZSM-5 with an Al$_2$O$_3$ free outer shell |
| U.S. Pat. No. 4,199,556 | Plank | ZSM-5 formed with N—cpds |
| U.S. Pat. No. 4,205,053 | Rollman | ZSM-5 formed with N—template and N basic cpd. |
| U.S. Pat. No. 4,139,600 | Rollman | ZSM-5 formed by use of diamines |
| U.S. Pat. No. 4,151,189 | Rubin | ZSM-5 formed by use of 2-9 carbon containing primary monoalkylamine |
| U.S. Pat. No. 4,285,922 | Audel | ZSM-5 formed by use of alkyl ammonium-N—oxide |
| U.S. Pat. No. 4,100,262 | Pelrine | Cobalt containing ZSM-5 |
| U.S. Pat. No. 4,273,753 | Chang | HZSM-5 type, produced through use of halide or oxyhalide to dealuminate zeolite |
| U.S. Pat. No. 4,275,047 | Whitton | ZSM-5 produced by seeding with Nu—1 crystal |

Davison Chemical Division of W. R. Grace's patents include:

| | | |
|---|---|---|
| U.S. Pat. No. 3,595,611 | McDaniel | PCY zeolite + Al$_2$O$_3$ - thermal stabilization |
| U.S. Pat. No. 3,607,043 | McDaniel | PCY zeolite + Al$_2$O$_3$ - thermal stabilization |
| U.S. Pat. No. 3,692,665 | McDaniel | PCY zeolite + Al$_2$O$_3$ - thermal stabilization |
| U.S. Pat. No. 3,676,368 | Scherzer | REHY zeolite + SiAl hydrogel + mordenite or type A |
| U.S. Pat. No. 3,894,940 | Scherzer | REHY zeolite + SiAl hydrogel + mordenite or type A |
| U.S. Pat. No. 3,925,195 | Scherzer | REHY zeolite + SiAl hydrogel + mordenite or type A |
| U.S. Pat. No. 3,293,192 | Maher | Z14-US |
| U.S. Pat. No. 3,449,070 | McDaniel | Z14-US |
| U.S. Pat. No. 3,867,310 | Elliott | CREY |
| U.S. Pat. No. 3,957,623 | McDaniel | CREY |
| U.S. Pat. No. 3,650,988 | Magee | Similar to Super D |
| U.S. Pat. No. 3,986,946 | Baker | Zeolite—SiO$_2$—MgO—F |
| U.S. Pat. No. 4,107,088 | Elliott | addition of Ti or Zr to matrix |
| U.S. Pat. No. 4,126,579 | Flaherty | silica gel - zeolite slurry (new spray nozzle design) |
| U.S. Pat. No. 4,218,307 | McDaniel | USY (NaY + RE → heat → acid treat) Si/Al |
| U.S. Pat. No. 4,144,194 | Guidry | faujasite + silicate from zeolite preparation |
| U.S. Pat. No. 4,164,551 | Elliott | Y zeolite preparation - silicate solution for matrix |
| U.S. Pat. No. 4,166,099 | McDaniel | Y zeolite preparation - seeded with zeolite <0.1 microns |
| U.S. Pat. No. 4,175,059 | Edwards | K faujasite - platelet type shape |
| U.S. Pat. No. 4,178,352 | Vaughn | Y zeolite preparation |
| U.S. Pat. No. 4,247,420 | Doumoulin | Si—Al cogel + zeolite |
| U.S. Pat. No. 4,332,699 | Nozemack | Al$_2$O$_3$ precipitated onto a zeolite |
| U.S. Pat. No. 4,333,859 | Vaughn | CSZ-3 Co-containing zeolite |
| U.S. Pat. No. 4,340,573 | Vaughn | Y zeolite preparation - zeolite from prep as seeds |
| U.S. Pat. No. 3,402,996 | Maher | NaY + RE → Calcination - multi-step exchange and calcination yielding Z14-HS & Z14-US |

Patents of others include:

| | | |
|---|---|---|
| U.S. Pat. No. 4,215,015 | Tu (UOP) | zeolite in a Si—Al matrix plus polymer; the polymer is burned out leaving a pore structure in the 100-300 A range; Ti can be added to matrix. |
| U.S. Pat. No. 4,239,615 | Tu (UOP) | zeolite in a Si—Al matrix plus polymer; the polymer is burned out leaving a pore structure in the 100-300 A range; Ti can be added to matrix. |
| U.S. Pat. No. 4,299,733 | Tu (UOP) | zeolite in a Si—Al matrix plus polymer; the polymer is burned out leaving a pore structure in the 100-300 A range; Ti can be added to matrix. |
| U.S. Pat. No. 4,333,821 | Tu (UOP) | zeolite in a Si—Al matrix plus polymer; the polymer is burned out leaving a |

| | | |
|---|---|---|
| | | pore structure in the 100-300 A range; Ti can be added to matrix. |
| U.S. Pat. No. 4,263,174 | Tu (UOP) | spray dried catalyst + RE salt solution; then dried but not washed; this gives RE by exchange and impregnation |
| U.S. Pat. No. 4,269,813 | Klotz (Amoco) | Borosilicate zeolite |
| U.S. Pat. No. 4,285,919 | Klotz (Amoco) | Borosilicate zeolite |
| U.S. Pat. No. 4,327,236 | Klotz (Amoco) | Borosilicate zeolite |
| U.S. Pat. No. 4,036,739 | Ward (Union) | $NH_4$ exchange - steam treat - $NH_4$ exchange (<1% $Na_2O$) in zeolite |
| U.S. Pat. No. 4,239,654 | Gladrow (Exxon) | USY + ZSM in a matrix |
| U.S. Pat. No. 4,308,129 | Gladrow (Exxon) | USY (5-40%) + 5-40% $Al_2O_3$ + 40-90% $Al_2O_3$ |
| U.S. Pat. No. 4,147,613 | Gladrow (Exxon) | 3-16% zeolite in matrix of $SiO_2$—$Al_2O_3$—$ZrO_2$ + 15-40% $Al_2O_3$. This produces a catalyst having at least 0.4 cc/g of its pore volume in pores >90° A. |
| U.S. Pat. No. 4,151,119 | Gladrow (Exxon) | 3-16% zeolite in matrix of $SiO_2$—$Al_2O_3$—$ZrO_2$ + 15-40% $Al_2O_3$. This produces a catalyst having at least 0.4 cc/g of its pore volume in pores >90° A. |
| U.S. Pat. No. 4,283,309 | Gladrow (Exxon) | 3-16% zeolite in matrix of $SiO_2$—$Al_2O_3$—$ZrO_2$ + 15-40% $Al_2O_3$. This produces a catalyst having at least 0.4 cc/g of its pore volume in pores >90° A. |
| U.S. Pat. No. 4,292,169 | Gladrow (Exxon) | 3-16% zeolite in matrix of $SiO_2$—$Al_2O_3$—$ZrO_2$ + 15-40% $Al_2O_3$. This produces a catalyst having at least 0.4 cc/g of its pore volume in pores >90° A. |
| U.S. Pat. No. 3,442,795 | Kerr (Mobil) | Stabilization of $NH_4$ to yield a high Si/Al ratio zeolite |
| U.S. Pat. No. 3,493,519 | Kerr (Mobil) | Stabilization with $NH_4$ to yield a high Si/Al ratio zeolite |
| U.S. Pat. No. 3,553,104 | Stover (Mobil) | A matrix of a pore volume > = 0.6 cc/g |
| U.S. Pat. No. 4,219,406 | Kuehl (Mobil) | Si—Al hydrogel + zeolite is spray dried, exchanged with $NH_4$—Al—RE ions then washed, dried and impregnated with RE's |
| U.S. Pat. No. 4,219,446 | Kuehl (Mobil) | Si—Al hydrogel + zeolite is spray dried exchanged with $NH_4$—Al—Re ions then washed, dried and impregnated with RE's |
| U.S. Pat. No. 4,326,993 | Chester (Mobil) | 1-75% zeolite + colloidal $SiO_2$ + colloidal $Al_2O_3$ + clay and 40% of pore vol. in 30-300A sized pores |
| USSN 195848 | 10Oct1980 Gladrow | (French Demande 2,491,777; 97CA 58340e) ultra stable Y-type zeolite 20%, porous $Al_2O_3$ particles 20%, silica-alumina gel matrix 60% and uniformally distributed rare earth oxides 0.01-0.08% used to crack gas oil (not heavy oil) to gasoline with conversion of 73.2% |

Procesing of the higher boiling fractions of crude oil in a fluid catalytic cracking unit has been practiced for many decades. The expertise developed has been along the lines of an easily vaporizable feed such as vacuum gas oil (VGO) containing very little contaminants. Thus, for many years, those skilled in the art have been concerned with developing catalysts having improved activity, improved selectivity, improved stability, and metal tolerance related to mild operations. By mild operations we refer to (1) feed contaminants being low (Conradson Carbon below 2 WT %, Ni+V contents of the feed below 5 ppm, endpoint of feedstock at 566° C. (1050° F.) (thus 100% vaporizable under process conditions), (2) mild process conditions (regenerator temperatures below 704° C. (1300° F.), no need to employ excessive amounts of steam and water as lift gas and coolants to maintain unit heat balance); this is also due to coke make, (3) catalyst properties with low porosity to reduce carryover of gases and hydrocarbon to regenerator, (4) catalyst stability—metal tolerance of matrix and zeolite not critical due to low metal deposition, and low regenerator temperature. The bad metal actor is nickel which is controlled by antimony addition.

The following table illustrates the changes in process severity and catalyst needs with feedstock change:

TABLE I

| | VGO | VGO + RESID | REDUCED CRUDE |
|---|---|---|---|
| FEEDSTOCK PROPERTIES | | | |
| VGO-% | 100 | 95 | — |
| FEEDSTOCK PROPERTIES | | | |
| Heavy Resid-% | — | 5 | — |
| Reduced Crude-% | — | — | 100 |
| Feed Endpoint °F. | 1050 | 1300 | up to 1800 |
| Conradson Carbon | 0.2 | 1-2 | 4-12 |

TABLE I-continued

|  | VGO | VGO + RESID | REDUCED CRUDE |
|---|---|---|---|
| Metals ppm | 0.2 | 5 | 10–200 |
| PROCESS CONDITIONS | | | |
| Reactor Temp. °F. | 940 | 940–960 | 945–1050 |
| Regenerator Temp °F. | 1150–1200 | 1200–1300 | 1300–1400 |
| Steam-$H_2O$ addition wt. % feed | <1% | 1–2% | 5–20% |
| CATALYST PROPERTIES | | | |
| Metals on Catalyst ppm | 500–1000 | 1000–3000 | 3000–20,000 |
| Carbon on Catalyst - wt. % feed | 4–5 | 6–8 | 8–16 |
| Effect of Ni | $H_2$—coke | $H_2$—coke | $H_2$—coke |
| Effect of V | nil | nil | $H_2$—coke and zeolite-matrix destruction |
| Pore size-Angstroms | varied | varied | 100–1000Å + larger |
| Pore Volume cc/gm | 0.2–0.3 | 0.3 | 0.4–0.5 or more |
| Acidity in the Matrix | No | No | Yes |
| Metal Passivation Ni | Ni w/Sb | Ni w/Sb | Ni w/Sb, + La + Ti + $Al_2O_3$ |
| Metal Passivation V | V-nil | V-nil | V w/ La + Ti + $Al_2O_3$ |
| Effect of Basic Nitrogen | nil | nil | Great |

To one skilled in the art the extension of known catalyst properties when processing of VGO to processing VGO+ small amounts of resid requires only a small adjustment or fine tuning of VGO catalysts properties to take care of the changes in process and feedstocks, e.g., small incresaes in metal content, Conradson Carbon, regenerator temperatures, and feedstock. This is demonstrated by the above patent literature in which individual properties have been varied to change or accent a single catalyst property or process variable.

However, in none of the attached references is the total concept of catalyst development for reduced crude processing anticipated by adopting zeolite type, cracking activity balanced by acid site strength (Bronsted and Lewis acids); partial rare earth addition; rare earth type; matrix properties such as activity, acidity, and proper matrix porosity; metal control through acidic site exchange; passivation and immobilization of nickel and vanadium; sieve accessibility; absorption and vaporization of heavy hydrocarbons; resistance to nitrogen poisoning and high sulfur levels; able to function at high process temperatures through selective cracking; thermal-hydrothermal stability of matrix and zeolites; low coke formation through choice of zeolite system and concentration in matrix; and still maintain a cost effective catalyst allowing resonable addition rates. Thus, the processing of reduced crude in a fluidized process employing the catalyst ofthis invention is a significant advance in catalyst development because it requires the utilization and the balance in a most highly developed form of the aforementioned properties.

The catalyst of this invention is also such an advance in which a select zeolite, having excellent thermal-hydrothermal stability through selected properties of silica-alumina ratio (unit cell constant), is only partially rare earth exchanged so as to enjoy a balance of acidity or activity via Bronsted and Lewis acid sites. This balance is critical to product distribution and to maintaining the optimum amount of acid sites or cracking sites in the unit to avoid overcracking and increased coke production. The amount of acidity present in the matrix is also balanced with zeolite acidity so as to maintain high selectivity to gasoline and avoid overcracking and coke deposition. Thus, there is a balance between zeolite properties and zeolite concentration in the matrix and the properties of the matrix itself to attain the aforementioned selectivities (gasoline-coke). In addition, the rare earth utilized is lanthanum rich so that a higher hydrothermal stable zeolite, also more resistant to vanadia, is obtained with better metal tolerance.

The matrix of the catalyst of this invention is as vital a part of the total catalyst as is the zeolite. The matrix must have the following properties: proper and selective pore size distribution, large pore volume, metal tolerance and metal immobilization properties, in addition to the typical properties of particle size distribution, density and good attrition index. Most importantly, it is necessary that the matrix also possess a considerable amount of, and stable acidity, in order to achieve molecular size reduction which permits a molecule entrance into the highly active zeolite. A critical balance between sieve and matrix acidity and acid strength as well as matrix resistance to thermal, hydrothermal and metals deactivation must also be achieved so that sieve and matrix acidity remain coupled and balanced as the catalyst ages.

The porosity (pore size-volume) of a catalyst is critical when processing reduced crudes. Since the catalyst of this invention requires an acidic matrix to crack the higher boiling components above 540° C. (1000° F.) to lower boiling fragments to ensure total vaporization of the feed, and to permit access of larger molecules to sieve pores, a specific pore volume and pore size distribution is required to ensure that all liquids and vapors can be absorbed and transported to the zeolite and all products transported away from the zeolite without encountering diffusional problems. Furthermore, a large pore volume is required to accommodate liquids depositing in the pores, and coke and metals depositing in the pores without affecting transport (diffusional problems of feed liquid and vapors to and product vapors from the zeolite particle.

Finally, an additional property is incorporated into the matrix in the form of metal passivators, immobilizers, and/or sacrificial sieves or traps. This involves the incorporation of such as alumina, titania or zirconia to immobilize nickel and vanadia, the precipitation of lanthanum into the matrix to immobilize vanadia, or the addition of less expensive sieves to serve as sacrificial sieves in order to spare the performance of the catalytic zeolite. It should be noted that the impregnation or exchange of La into the matrix is much less effective for Ni-V immobilization. It is preferred that the La be precipitated onto the matrix.

It will be noted that the multi-concepts and combinations incorporated into the development of the catalyst of this invention for reduced crude processing is not readily available from the literature and required development of the concepts singularly and then on a multi-compositional basis.

Despite all of the work evidence by the above patents, and by many others in this general field, the prior investigators have not combined the selected reactivity and physical properties of zeolites, silica-alumina gels, clays, aluminas, rare earths, and other additives to achieve the low coke, low $H_2$, high octane, high activity, high gasoline selectivity, low slurry oil, metals tolerant and high thermal and hydrothermal stability of the catalysts described in this application. Prior commercial catalyst produce undesirable levels of slurry oil or produce too much catalytic coke.

Stability of prior catalysts, especially when loaded with metals such as vanadia at higher regenerator temperatures has also been a serious problem. The lack of metal poisoning resistance or prior catalyst has, over the past 40 years, been perhaps the single most difficult problem and barrier to the production of transportation fuels from residual oils.

SUMMARY OF THE INVENTION

The process for catalytic cracking of vacuum gas oils has gradually evolved over a period of many years from a hardware stand point to its present state of highly sophisticated development, hardly recognizable with those early units. However, some of the considerable advances in hardware have come about as the result of the introduction of new and very unique and highly active catalysts (namely the zeolites) causing the development of riser cracking with very short contact times.

Similarly, with regard to reduced crude conversion of carbo metallic oils, after some similar 40 years of frustration, a process has now been developed (Myers, Busch U.S. Pat. No. 4,249,687) with all its attendant hardware, designed to facilitate the conversion of these high boiling residues into high octane gasoline with low capital investment and operating costs, and in the absence of hydrogen pretreatment. However, it was fully appreciated, even in this case, that in order to further realize or achieve the full and tremendous potential volume of liquid transportation products inherent in the catalytic conversion of reduced crude, that new and highly improved catalysts would be most desirable.

As previously pointed out in a letter to the editor of Science (1980) is was stated that it was the intent of research to evolve a catalyst which could, in this process, utilize as much as possible all the hydrogen and carbon present in the feed stock in a most efficient manner. In this regard, it was pointed out that with an ideal catalyst, there is sufficient hydrogen available in reduced crude so as to convert all the carbon and hydrogen into a combination of toluene and pentenes, in volumes over 100% yeild, and with octane numbers over 100, and that the only limiting factor to achieving this result is the catalyst, not the hydrogen/carbon balance.

With that realization in mind, the inventors of this new catalyst have sought by very intensive research means to create a catalyst which, when harnessed with the unique features of the reduced crude conversion process, would serve to achieve a yeild of liquid transportation products previously not considered possible and within affordable catalyst costs. In order to achieve this objective, it has been necessary that all desirable and required properties of a catalyst be tuned to this goal. As a result, the catalyst described here, when operating on this very low quality feedstock, is still able to:

reduce and minimize cake and hydrogen production,
maximize gasoline and light cycle oil yeild,
immobilize or reduce the effect of vanadia,
inhibit or reduce the adverse effect of nickel,
facilitate cracking in the presence of high molecular weight molecules so as to achieve cracking in the sieve,
operate in the presence of high molecular weight basic nitrogen compounds which tend to neutralize acid sites,
operate in the presence of large coking molecules such as asphaltenes, without allowing these macro molecules to block access of smaller molecules to catalyst sites,
be economically acceptable.

In this catalyst, all of these features were focused on and optimized so as to produce a high performance, coordinated efficient catalyst, to be harnessed with an equally new reduced crude conversion process in order to further optimize yield.

(I) General Statement of the Invention

According to the present invention, catalysts are prepared which are capable of catalytically cracking heavy reduced crude feeds in a process generally according to the parameters described in the aforementioned U.S. Pat. No. 4,322,673. Acidity is provided in the matrix to better convert larger molecules to smaller high boiling hydrocarbon molecules able to vaporize and enter the molecular sieves, so as to produce molecules boiling in the 38° to 343° C. (100° to 650° F.) boiling range e.g. $C_5$-$C_{15}$ paraffins, olefins and aromatics. This range is the transportation fuel range and the effect of the present catalyst and related process is to provide a substantial increase in the amount of transportation fuels and substantially reduce the yield of residual fuels or asphalt, which are derived from a barrel of crude oil as well as permitting the conversion of otherwise distressed hydrocarbon feedstocks into valuable transportation fuels.

The catalyst of the present invention preferably comprise zeolites e.g. HY-type molecular sieves, clays e.g. kaolins and a substantial portion of silica-alumina gels. Preferably the catalysts are partially promoted by several means with a high ratio of lanthanum (La) to cerium (Ce) solution. The catalysts of the invention, when combined with the optimum process conditions for processing heavy oil provide the following benefits:

A. low catalytic coke production;
B. high light catalytic cycle oil (LCO) to slurry oil (Slurry) ratio in products;
C. excellent resistance to metal contamination and poisoning;
D. excellent cracking activity in the presence of high metals containing feedstocks;
E. stability under high temperatures permitting severe regeneration conditions to remove the high amounts of carbon laid down by residual oils;
F. high gasoline selectivity and production;
G. low slurry production;
H. high octane gasoline;

I. good resistance in terms of catalytic cracking of high basic nitrogen containing feedstocks;
J. high activity while exposed to large asphaltene molecules,
K. is acceptably low in cost.

(2) Utility of the Invention

The invention is useful in converting low valued distress oils and crude oils into high valued transportation fuels.

BRIEF DESCRIPTION OF THE DRAWINGS

FIG. I is a plot showing conversion of reduced crude to products having boiling points less than 221° C. (430° F.) (in volume percent) versus the LCO/Slurry (volume) ratio for certain known catalysts and for catalysts produced according to the present invention.

FIG. II is a plot of gasoline selectivity versus the afore mentioned volume percent conversion to $C_5$–430° F. products.

Figure 1:
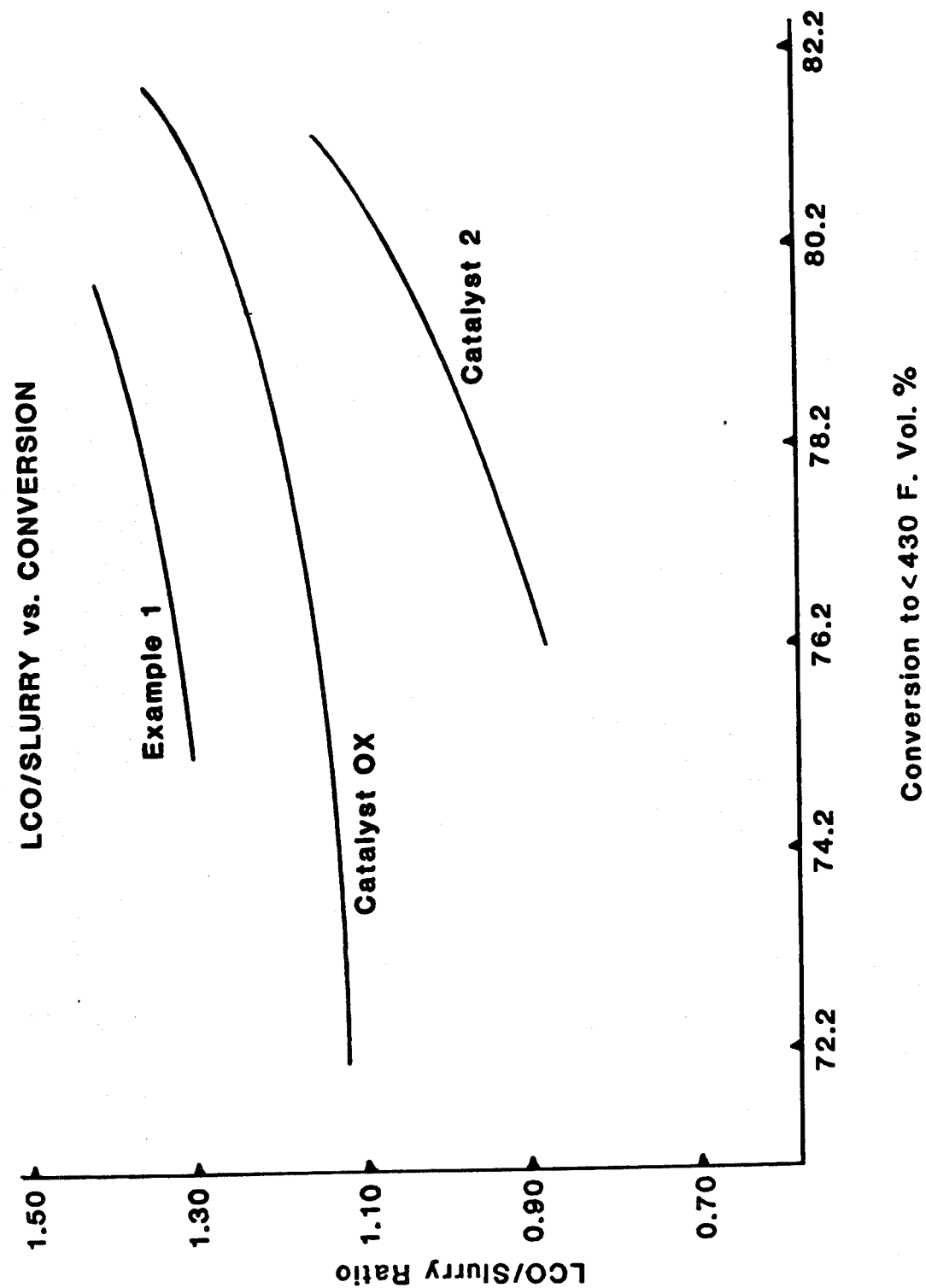

FIG. III is a plot of the conversion to coke versus the volume percent conversion to $C_5$–430° F. products.

FIG. IV is a plot of gasoline ($C_5$ to below 430° F.) yield (volume %) versus $C_5$–430° F. products conversion.

FIG. V is a plot of the conversion to volume % light catalytic cycle oil (430°–630° F.) versus $C_5$–430° F. products.

FIG. VI is a plot of the conversion to slurry oil (heavy catalytic cycle oil, 630+° F.) products.

FIG. VII is a schematic diagram of a preferred catalyst of the invention.

FIG. VIII is a flow diagram of one method of preparation of the catalyst of Example 1.

FIG. IX is a plot of gasoline yield ($C_5$+ —430° F. product) versus catalyst ratio pore volume (cc/g).

FIG. X is a plot of catalyst activity versus rare earth content of zeolite.

FIG. XI is a plot of yield of products (gasoline, gas, coke) versus rare earth content of zeolite.

FIG. XII is a plot of catalyst versus method of lanthanum addition to catalyst.

FIG. XIII is a plot of catalyst activity versus steaming temperature comparing the catalyst of this invention to conventionally available catalysts.

DESCRIPTION OF THE PREFERRED EMBODIMENTS (I): As mentioned above, the feed for the present invention can be crude oil but, for the full economic realization of the capabilities of the invention, the feed material will generally be low valued refractory crudes or portions of crude oils which are especially high in carbon and metals.

Feed materials particularly useful with the invention comprise but are not limited to: reduced crude oil from e.g. West Texas, Illinois, Kentucky, Kansas light, medium and heavy Dubai, light, medium and heavy Arabian, Quatar, Mayan, Isthmus, Nigerian, Venezuelean, and other residual oils, other reduced crudes, vacuum tower bottoms, slurry oils, tar sands, asphalts, bitumens, shale oils, heavy resids, deasphalted gas oil, coker gas oil and gas oil from Engelhard's "ART" demetalizing contractors, and/or heavy oil hydrogen treating process products.

CARBO-METALLIC OIL CONVERTER FEED

The present invention provides a process for the continuous catalytic conversion of a wide variety of carbo-metallic oils to lower molecular weight products, while maximizing production of highly valuable liquid products, and making it possible, if desired, to avoid vacuum distillation and other expensive treatments such as hydrotreating. The term "oils", includes not only those predominantly hydrocarbon compositions which are liquid at room temperature, i.e., 20° C. (68° F.), but also those predominantly hydrocarbon compositions which are asphalts or tars at ambient temperature but liquify when heated to temperatures in the range of up to about 427° C. (800° F.). The invention is applicable to carbo-metallic oils, whether of petroleum origin or not. For example, provided they have the requisite boiling range, carbon residue on pyrolysis and heavy metals content, the invention may be applied to the processing of such widely diverse materials as heavy bottoms from crude oil, heavy bitumen crude oil, those crude oils known as "heavy crude" which approximate the properties of reduced crude, shale oil, tar sand extract, products from coal liquification and solvated coal, atmospheric and vacuum reduced crude, extracts and/or bottoms (raffinate) from solvent de-asphalting, aromatic extract from lube oil refining, tar bottoms, heavy cycle oil, slop oil, other refinery waste streams and mixtures of the foregoing. Such mixtures can for instance be prepared by mixing available hydrocarbon fractions, including oils, tars, pitches and the like. Also, powdered coal may be suspended in the carbo-metallic oil. Persons skilled in the art are aware of techniques for demetalation of carbo-metallic oils, and demetalated oils may be converted using the invention; but it is an advantage of the invention that it can employ as feedstock carbo-metallic oils that have had no prior demetalation treatment. Likewise, the invention can be applied to hydrotreated feedstocks; but it is an advantage of the invention that it can successfully convert carbo-metallic oils which have had substantially no prior hydrotreatment. However, the preferred application of the process is to reduced crude, i.e., that fraction of crude oil boiling at and above 343° C. (650° F.), alone or in admixture with virgin gas oils. While the use of material that has been subjected to prior vacuum distillation is not excluded, it is an advantage of the invention that it can satisfactorily process material which has had no prior vacuum distillation, thus saving on capital investment and operating costs as compared to conventional FCC processes that require a vacuum distillation unit.

In accordance with the invention one provides a carbo-metallic oil feedstock, at least about 70%, more preferably at least about 85% and still more preferably about 100% (by volume) of which boils at and above about 343° C. (650° F.). All boiling tempuratues herein are based on standard atmospheric pressure conditions. In carbo-metallic oil partly or wholly composed of material which boils at and above about 343° C. (650° F.), such material is referred to herein as 343° C.+ (650° F.+) material; and 343° C.+ (650° F.+) material which is part of or has been separated from an oil containing components boiling above and below 343° C. (650° F.) may be referred to as a 343° C.+ (650° F.+) fraction. But the terms "boils above" and "343° C.+" ("650° F.+") are not intended to imply that all of the material characterized by said terms will have the capability of boiling. The carbo-metallic oils contemplated by the invention may contain material which may not boil under any conditions; for example, certain asphalts and asphaltenes may crack thermally during distillation, apparently without boiling. Thus, for example, when it is said that the feed comprises at least about 70% by volume of material which boils above about 343° C. (650° F.), it should be understood that the 70% in question may include some material which will not boil or volatilize at any temperature. These non-boilable materials, when present, may frequently or for the most part be concentrated in portions of the feed which do not boil below about 538° C., 552° C. or higher (about 1000° F., 1025° F. or higher). Thus, when it is said that at least about 10%, more preferably about 15% and still more preferably at least about 20% by (by volume) of the 343° C.+ (650° F.+) fraction will not boil below about 538° C. or 522° C. (1000° F. or 1025° F.), it should be understood that all or any part of the material not boiling below about 538° C. (1000° F.) or 552° C. (1025° F.), may or may not be votlatile at and above the indicated temperatures.

Preferably, the comtemplated feeds, or at least the 343° C.+ (650° F.+) material therein, have a carbon residue on pyrolysis of at least about 2 or greater. For example, the Ramsbottom carbon content may be in the range of about 2 to about 12 and most frequently at least about 4. A particularly common range is about 4 to about 8. Note that the illustrative VGO in Table 1 has a Ramsbottom carbon residue value of 0.38, and that the 343° C. to 552° C. (650° F. to 1025° F.) fractions of the various reduced crudes have Ramsbottom carbon values between about 0.3 and about 0.5, whereas the various reduced crudes as a whole (650+ Total) vary upwards in Ramsbottom carbon value from about 4 to about 16.8, and still higher values are contemplated.

Preferably, the feed has an average composition characterized by an atomic hydrogen to carbon ratio in the range of about 1.2 to about 1.9, and more likely about 1.3 to about 1.8

The carbo-metallic feeds employed in accordance with the invention, or at least the 343° C.+ (650° F.+) material therein, may contain at least about 4 parts per million of Nickel Equivalents, as defined above, of which at least about 2 parts per million is nickel (as metal, by weight). Carbo-metallic oils within the above range can be prepared from mixtures of two or more oils, some of which do and do not contain the quantities of Nickel Equivalents and nickel set forth above. It should also be noted that the above values for Nickel Equivalents and nickel represent time-weighted averages for a substantial period of operation of the conversion unit, such as one month, for example. It should also be noted that the heavy metals have in certain circumstances exhibited some lessening of poisoning tendency after repeated oxidations and reductions on the catalyst, and the literature describes criteria for establishing "effective metal" values. For example, see the article by Cimbalo, et al, entitled "Deposited Metals Poison FCC Catalyst", *Oil and Gas Journal,* May 15, 1972, pp 112-122, the contents of which are incorporated herein by reference. If considered necessary or desirable, the contents of Nickel Equivalents and nickel in the carbo-metallic oils processed according to the invention may be expressed in terms of "effective metal" values. Notwithstanding the gradual reduction in poisoning activity noted by Cimbalo, et al, the regeneration of catalyst under normal FCC regeneration conditions may not, and usually does not, severely impair the dehydrogenation, demethanation and aromatic condensation activity of heavy metals accumulated on cracking catalyst.

The feed materials for the present invention will generally have boiling ranges in the range of from about 221° C. to about 982° C. (about 430° F. to about 1800° F.), more preferably from about 316° C. to about 926° C. (about 600° F. to about 1700° F.), and most preferably from about 343° C. to about 815° C. (about 650° F. to about 1500° F.). Particularly preferred are fractions which contain a substantial portion of 343° C.+ (650+° F.) boiling point materials. Such component materials include chemical structures such as paraffins, aromatics and polar compounds, e.g. O-, N-, S-, substituted hydrocarbons and asphaltenes and porphyrins. Dilution with lighter materials will be advantageous with certain feeds.

The feed materials will generally have Ramsbottom Carbon numbers (ASTM Test D 524) in the range of from about 2 to about 12%, more often from about 3 to about 8%, and most often from about 4 to about 8% by wt. of carbon. Corresponding Conradson Carbon (ASTM Test D 189) will be somewhat higher and can be correlated by ASTM correlation curves.

Generally the feed materials will contain metals particularly nickel, vanadium, sodium, copper and iron, as well as other metals, e.g. calcium. Total nickel-plus-vanadium will be present in the amount of about 5 to 200, more often 10 to 150, and most often (for economic reasons) from about 10 to 100 ppm by weight of total feed.

Less applicable to the present invention, particularly because of the unusual tolerance of the catalysts of the present invention to total metals, is the scale of Nickel Equivalents:

$$\text{Ni Equivalents} = \text{Ni} + \frac{V}{4.8} + \frac{Fe}{7.1} + \frac{Cu}{1.23}$$

as mentioned in the literature, e.g. at column 2 line 41 of U.S. Pat. No. 4,299,687 to Myers and Busch). Assuming that the amount of vanadium is approximately equal to the amount of nickel, then the feedstocks of the present invention will generally be in the range of from about 4 to about 120 ppm of Nickel Equivalents.

Catalyst Composition

Catalysts of the present invention can be characterized as containing predominantly zeolite, clay and substantial amounts of silica-alumina gel as well as controlled amounts of rare earths and other oxide promoters and immobilizers. Table II shows the typical physical and chemical properties of the catalyst. Weight percents are based on the total weight of the dry finished catalyst unless otherwise noted.

Accordingly, the process may be practiced with catalyst bearing accumulations of heavy metals which heretofore would have been considered quite intolerable in conventional FCC-VGO operations. For these reasons, operation of the process with catalyst bearing heavy metal accumulations in the range of about 3,000 to about 30,000 ppm Nickel Equivalents, on the average is contemplated. More specifically, the accumulation may be in the range of about 4,000 to about 30,000 ppm and particularly more than about 5,000 to about 30,000 ppm. The foregoing ranges are based on parts per million of Nickel Equivalents, in which the metals are expressed as metal, by weight, measured on and based on regenerated equilibrium catalyst. However, in the event that catalyst of adequate activity is available at very low cost, making feasible very high rates of catalyst replacement, the carbo-metallic oil could be converted to lower boiling liquid products with catalyst bearing less than 2,000 ppm Nickel Equivalents of heavy metals. For example, one might employ equilibrium catalyst from another unit, for example, an FCC unit which has been used in the cracking of a feed, e.g., vacuum gas oil, having a carbon residue on pyrolysis of less than 1 and containing less than about 4 ppm Nickel Equivalents of heavy metals.

In any event, the equilibrium concentration of heavy metals in the circulating inventory of catalyst can be controlled (including maintained or varied as desired or needed) by manipulation of the rate of catalyst addition discussed above. Thus, for example, addition of catalyst may be maintained at a rate which will control the heavy metals accumulation on the catalyst in one of the ranges set forth above.

In general, it is preferred to employ a catalyst having a relatively high level of cracking activity, providing high levels of conversion and productivity at low residence times. The conversion capabilities of the catalyst may be expressed in terms of the conversion produced during actual operation of the process and/or in terms of conversion produced in standard catalyst activity tests. For example, it is preferred to employ catalyst which, in the course of extended operation in the process, is sufficiently active for sustaining a level of conversion of at least about 40% and more preferably at least about 50%. In this connection, conversion is expressed in liquid volume percent, based on fresh feed. Also, for example, the preferred catalyst may be defined as one which, in its virgin or equilibrium state, exhibits a specified activity expressed as a volume percentage derived by the MAT (micro-activity test). For purposes of the present invention the foregoing percentage is the volume percentage of standard feedstock that is converted to 221° C. (430° F.) end point gasoline and lighter products at 482° C. (900° F.), 16 WHSV (weight hourly space velocity), calculated on the basis of catalyst dried at 593° C. (1100° F.) and 3C/O (catalyst to oil ratio) by the tentative ASTM MAT test developed by ASTM Committee D-32, using an appropriate standard feedstock, e.g. Davison WHPS-12 primary gas oil.

TABLE II

| CHEMICAL ANALYSES | Typical Analysis Catalyst of Invention |
|---|---|
| $SiO_2$ | 58.3 |
| $Al_2O_3$ | 40.1 |
| $TiO_2$ | 0.52 |
| $Fe_2O_3$ | 0.43 |
| $Na_2O$ | 0.42 |
| $Re_2O_3$ | 1.29 |
| $La_2O_3$ | 0.74 |
| $CeO_2$ | 0.14 |
| $Nd_2O_3$ | 0.31 |
| $Pr_6O_{11}$ | 0.10 |
| $La_2O_3/CeO_2$ Ratio | 5.3 |
| MgO | — |
| PHASE COMPOSITION | |
| Zeolite Type | USY |
| Zeolite Lattice K | 24.58 |
| Zeolite Content | |
| % Int./Na Y | 8.8 |
| Internal Std. | 7.7 |
| Nitrogen Method | 15 |
| Kaolinite | 45 |
| PORE SIZE DISTRIBUTION | cc/g (% of Total Pore Volume) |
| 6000 Å | 0.03 cc/g (0)% |
| 6000–1000 Å | 0.09 cc/g (15%) |
| 1000–400 Å | 0.18 cc/g (31%) |
| 400–200 Å | 0.12 cc/g (21%) |
| 200–100 Å | 0.09 cc/g (16%) |
| 100–80 Å | 0.03 cc/g (5%) |

TABLE II-continued

| 80–60 Å | 0.03 cc/g (6%) |
|---|---|
| 60–20 Å | 0.04 cc/g (6%) |
| SURFACE AREA, m2/g | 198 |
| Zeolite Area, m2/g | 99 |
| External Area, m2/g | 108 |
| PORE VOLUME, cc/g | |
| Water P.V. cc/g | 0.59 |
| SKELETAL DENSITY, g/cc | 2.57 |
| Apparent Bulk Density g/cc | 0.56 |

Though not wishing to be bound by any theory, the acidity provided in the matrix of the catalyst is believed to more efficiently convert the large non-vaporizable and frequently structurally non-accessible molecules to zeolite pore dimensions and vaporizable hydrocarbon molecules of molecular weight which can contact and enter the zeolite and are thereby converted to compounds in the 38° C.–343° C. (100° F.–650° F.) boiling range (Note FIG. IX). The pore volume and the pore volume distribution is designed to rapidly ingorge and provide broad avenues by which to facilitate access to specific sites for the large hydrocarbon molecules, while the increased pore volume assists in distributing the asphaltenes over a greater portion of the catalyst, the combination thereby serving to minimize plugging and blocking of reactant molecules to the zeolite. Also, the high pore volume is intended to speed the departure of smaller molecules before undesirable secondary reactions occur at the acidic sites. To comprehend the importance of proper design of pore structure, it should be noted that 100 g. of a typical catalyst can contain over 100 million miles of torturous channels.

Catalyst Zeolite (Useful references include Zeolite Chemistry and Catalysis, Jule A. Rabo (ACS Monograph 171, copyright 1976) Chapter 4, Lattice Cell Constant and the aformentioned Davison Z-14 patents.)

Particularly preferred as starting materials for the present invention are HY zeolites containing rather weak, acidic sites, which produce low catalytic coke while demonstrating increased resistance to metal contamination and high temperature operations. Such zeolites also include H-Y modifications, such as Davison's Z-14US and LZ-Y72 available from Union Carbide Corporation. The preferred sieves are such as Z-14U.S. and similar sieves with cell constants between 23.30–24.70 Å. Also preferred are $NH_4$ enchanged Y sieves which convert to HY sieves upon calcination, or in use in the cracking process. The RCC process is especially suited for use of these zeolites due to the nature of the two-stage regenerator. HY zeolites are prepared in many ways such as by Davison's ultra stable technique, pressure exchange, use of $F_2$ to redistribute aluminum cations and other methods known to yield similar products.

It appears probable that the new HY zeolites (which are cheaper relatively) are to some degree converted in situ in the regenerator, especially the two-stage RCC regenerator, to Ultra Stable Y zeolites (which are much more expensive).

Catalyst Clays

A wide variety of clays may be advantageously employed in the catalyst of the present invention and particularly preferred are mixtures of a number of different clays. Suitable clays include, among others, halloysite, ball clay and Hydrite UF produced by Georgia Kaolin. Huber 80B by Huber Co., and Kaowhite and Kaogloss produced by Thiele Company, and naturally occurring kaolinites and boehmites.

The kaolin clay will preferably have crystallites (particles) 80% of which have a size of less than about 2 microns (spherical equivalents), more preferably less than about 1 micron, and most preferably less than about 0.5 microns.

The desired percentage composition ranges for clays should preferably be from about 20 to about 65, more preferably from about 30 to about 60, and most preferably from about 35 to about 50, based on the weight of the total catalyst. While not generally appreciated, by a selective method of incorporation, and by selective choice of kaolin clay with a high diameter to thickness ratio, preferably 10/1 or greater, utilized in this catalyst preparation, the clay can be converted into a house of cards arrangement, so as to achieve the preferred pore structure described herein.

Catalyst Gels

The gels employed in the preparation of the catalysts of the present invention are preferably silica-alumina gels e.g. high and low alumina on silica gels, silica-alumina gels, co-gels and alumina-coated silica gels. These can be produced by techniques known to those skilled in the art, e.g. see U.S. Pat. Nos. 2,951,815 (Craven); 3,034,994 (Braithwaite, McGrew, Hettinger, D'Amico); 3,346,509 (Stewart) and 4,226,743 (Seese) which are incorporated herein by reference.

The percentage of gels will range from about 30 to about 60, more preferably from about 30 to about 50, and most preferable from about 35 to about 45 percent by weight based on the total weight of the catalyst. In particular co-gels are especially preferred as they not only provide an acidic matrix of major importance but they also possess a non-crystalline zeolite like character to the gel wherein nickel, vanadium and other metallic contaminants can be trapped.

Co-Gel Matrix

This invention involves the preparation of a heavy hydrocarbon cracking catalyst which contains an improved matrix binding system so that the catalyst is thermally and hydrothermally stable and attrition resistant when contaminated with high metals. It has been found that the particular method described here will result in a catalyst which has acidity not only in the zeolite but also in the matrix binding system. This acidity in the matrix is found to be critical to the efficient cracking of large hydrocarbon molecules found in heavy petroleum fractions. These heavy hydrocarbons may range up to 100 Å in size and cannot be catalytically cracked in the 13 Å cavity of the zeolite as done with normally light FCC feedstocks. In our catalysts the large organic compounds are first cracked at a matrix acidic site into smaller molecules which can then be vaporized and reacted further at the zeolite sites. The matrix is able to crack the heavy petroleum fraction because it has a large portion of its pore volume in stable pores in the 100 to 1000 Å range and many of the acidic sites are located along these pores.

The pore volume of the final catalyst can be made to fall between 0.2 and 0.7 cc/gm without losing its unique attrition properties but we have found that a pore volume near 0.45–0.55 cc/gm to be particularly desirable.

Typically, the catalyst prepared by these procedures will contain from 20 to 50 percent clay, from 0 to 30 percent alumina in the form of a precipitate; from 5 to 30 percent zeolite, with the remaining composition comprising the silica-alumina co-gel.

It is the alumina phase of the matrix system which is believed to provide both stabilization to the zeolite and matrix acidic sites while also passivating the contaminant metals which prevents their destruction of the zeolite.

Although other hydrogel gel systems have been disclosed, such as U.S. Pat. No. 3,912,619 Maze et al, they do not have the unique combination of proper pore volume, pore size distribution, attrition resistance and stable acidic-sites of the new co-gel system. Systems which contain an alumina phase such as U.S. Pat. Nos. 4,333,857 and 4,253,989 to Lim et al have been disclosed to improve abrasion resistance but they do not possess the high matrix acidity and proper pore volume distribution obtained with the product of the disclosure.

Broadly, the invention contemplates the use of a catalyst system produced from a system wherein sodium silicate and clay is reacted with aluminum sulfate and sodium aluminate at high pH to produce a hydrogel. This hydrogel is further reacted with aluminum sulfate to achieve a slurry with a pH near 4. The pH of the slurry is increased to near 6 with ammonium hydroxide to precipitate the soluble aluminum. A zeolite may be added before or after the alumina precipation step. The slurry is filtered, washed, spray dried and ion exchanged to form the final cracking catalyst.

Catalyst Rare Earths

Rare earths useful for the present invention include cerium, lanthanum, neodynium, praesodymium, samarium, but any of the elements generally termed "rare earths" may be employed advantageously with special applications of the invention.

Particularly preferred are ratios of from about 0.5 to about 6, more preferably from about 1 to 5, and most preferably from about 2 to 4 of lanthanum to cerium and such ratios will generally be present in amounts ranging from about 0.50 to 2.0 wt % rare earth oxides, based in total catalyst.

Catalyst Pore Volume

Because of the nature of the feedstocks being processed by the catalyst of the present invention, the pore volume of the present catalyst has been found to be partially important. The high boiling impurities (e.g. above about 510° C. (about 950° F.)) which are found in relatively high amounts in the heavy crude feedstocks employed with the present invention, do not vaporize readily and some such as asphaltenes are not susceptible to vaporization and are laid down on the catalyst under the conditions of temperature and pressure utilized in the process. These heavy materials are therefore laid down on the catalyst and can either undergo thermal cracking or catalytic cracking. For catalytic cracking, there must be either acidic sites on the surface of the catalyst matrix or the heavy materials must diffuse through the pore structure of the catalyst to contact the inner zeolite crystals.

When one contemplates that from 20-50% of reduced crude exists as a liquid at the conditions of the riser, it can be visualized that this liquid material boiling above 510° C. (950° F.), can cause pore plugging and can lead to diffusion problems both with regard to the feed diffusing into the catalyst to contact the acidic sites of the matrix and/or the zeolite, and also the products of cracking diffusing out. Taking these problems into consideration, the present invention employs a pore volume in its catalyst of above about 0.4 cc/gram, more preferably above about 0.45 cc/gram. This pore volume should principally be in the matrix of the catalyst. By having a pore volume of 0.45 cc/gram, or even greater, and utilizing a catalyst to oil ratio of 6 to 14:1, the total volume of catalyst pore volume will be some 3 to 7 times the volume of the feed introduced, so that the ability of the feed to completely block or substantially restrict a pore will be statistically reduced to a very low level.

Water pore volume is determined by the well-known W. R. Grace Method 401, water titration test for pore volume.

A second reason for the high pore volume is due to the high metals, e.g. nickel, vanadium and iron, contained in the feeds utilized with the present invention which can gradually build up on the outer surface of the catalyst, decreasing pore volume and blocking off the acidic matrix from contact with fresh feed materials. With the high pore volume of the present invention, even with substantial metal coating and blocking, a large pore volume will remain to provide relatively easy ingress of feed materials to the acidic matrix and egress of cracked products from the matrix. When utilizing an acidic matrix, the high pore volume permits the feed materials, which may be in the liquid state, to diffuse easily into the matrix, and once having cracked, the feed materials, now in the gaseous state, can more readily diffuse for further cracking in the matrix and preferably in the zeolite and also exit rapidly from the matrix.

Related catalysts and processes for their manufacture are discussed in U.S. Ser. No. 06/318,185, filed May 20, 1981 (PCT 00492 filed in the U.S. Receiving Office Apr. 10, 1981 and assigned to Ashland Oil, Inc. and entitled "Large Pore Volume Catalysts for Heavy Oil Conversion"). The entire disclosure of that application also being incorporated herein by reference.

Catalyst Pore Distribution

As previously mentioned, the catalyst pore size distribution is relatively critical in the catalyst of the present invention for conversion of heavy oils, to facilitate handling of the highly viscous material which is deposited within the pores and to permit it to be cracked, and permitting vaporization under the temperatures, and pressures existing in the reaction zone, thereby facilitating transport as a vapor to the zeolite matrix of the catalyst for further cracking.

If pore distribution is too small, one can obtain pore blockage and if too large, one obtains only a few pores for admitting feed stock to the matrix.

Therefore, this catalyst emphasizes (in the sense of this catalyst) two things: there is a critically balanced action between the matrix and the zeolite; within the matrix we have a zeolite catalyst consisting of zeolite particles as disclosed and which zeolites in this application and in other applications by Ashland Oil are of preferred minimum size. By minimum size we mean preferably below one micron and attempting to approach a tenth of a micron in size or less. Frequently the crystallites may, by SEM, appear to be even smaller but occurring in clumps. It is also preferred that clumps be dispersed. Thus with these small particles one needs an extensive and optimized pore size distribution to ensure an adequate and usable approach for reactants which enables the vaporized hydrocarbons to enter the "portal" surface area of the zeolite and also to exit the zeolite, thus diminishing diffusion problems. In the course of our work, catalysts have been evaluated that have had adequate pore volume but with a pore size distribution mainly in the 1,000–6,000Å range being associated with low surface area and therefore low acidity content, and these have tended to be less effective. However, on the other hand, a catalyst, when incorporating certain materials may have only microporosity, e.g. with pore sizes mainly in the 20–50 or 20–70Å range. This is, on the other hand, too small of a size because diffusion rates are greatly reduced and are readily blocked by heavy non-vaporized materials. These small pores are also associated with large surface area and, because of their size and associated surface area, retain much carbonaceous material, difficult to remove by stripping, thereby resulting in enhanced coke. The ideal pore size distribution should be in a range of about 100–1000 Angstroms, and with additional feeder pores or dual pores which feed into the pore size in the range of 1000–6,000Å with balanced matrix and zeolite acidity — the matrix serves to permit access of molecules to the sieves, protect the sieves, break down large molecules to proper size for sieve cracking, convert slurry oil to LCO or gasoline, and block the poisoning action of basic nitrogen compounds.

Balanced Acidity

By balanced acidity between the sieve and the matrix, we refer to that acidity measured by titration with n-butylamine, which value represents the acidity in both the matrix and the sieve. Titration with tridodecylamine, however, a molecule unable to enter the sieve, represents accessible acidity in the matrix. Therefore acidity in the matrix, after thermal treatment at 149° C. (300° F.) is measured by use of tridodecylamine and acidity in the sieve by n-butylamine titration of the sieve alone. Acidity contribution by the sieve then is equal to acidity by n-butylamine, as measured in the absence of matrix times the concentration in the finished catalyst. The ratio of acidity in the matrix to acidity contributed by the sieve may be expressed as:

$$\frac{\text{n-tridodecylamine acidity}}{\text{n-butylamine acidity of sieve}}$$

The following Table III presents values for acidity distribution for the catalyst in this application compared with SDX, a catalyst well recognized as being excellent for vacuum gas oil processing.

It can be seen that the SDX catalyst has essentially no acidity in the matrix and thus is unable to catalytically crack extraordinarily large molecules, as is the catalyst described herein. Note that in the case of the catalyst described herein, the ratio of matrix acidity to sieve acidity is 1.0.

TABLE III

|  | n-butylamine Total Acidity in the Sieve | tridodecyl-amine Matrix Acidity | Ratio Matrix Acidity Sieve Acidity |
|---|---|---|---|
| Catalyst #1 (conv.) | 0.25 | 0.00 | 0.00 |
| Catalyst of Invention | 0.22 | 0.22 | 1.00 |

TABLE III-continued

| | n-butylamine Total Acidity in the Sieve | tridodecyl- amine Ma- trix Acidity | Ratio Matrix Acidity Sieve Acidity |
|---|---|---|---|
| Example 1 | | | |

Total acidity is measured after calcining the catalyst at 149° C. (300° F.) for 16 hours in air.

Ion Exchange Properties Related to Metals Tolerance

It has been demonstrated that the catalysts described herein are exceptionally resistant to metals poisoning. While not wishing to be held to theory, it isproposed that this special matrix, by means of co-gelling, possesses small ion exchange zones not unlike the ion exchange properties of the old now crystalline synthetic zeolite water softener gelsof the 1930's. E.g. the following table shows the results of titrating the finished catalyst with n-butylamine and tridodecylamine and compared with the zeolite contained acidity.

TABLE IV

| Catalyst of Invention Example 1 | |
|---|---|
| n-butylamine acidity total catalyst | 0.77 meg/gm |
| n-butylamine acidity of contained sieve | 0.22 meg/gm |
| tridodecylamine acidity | 0.22 meg/gm |
| Total accessible acidity | 0.44 meg/gm |
| Total micro porous acidity unaccounted for and evidently in the matrix | 0.33 meg/gm |

The results show that the catalyst possesses some 0.33 meg/gm of ion exchangeable acid sites that are neither in the sieve, nor accessible to tridodecylamine, but obviously still available for binding or inactivating contaminating metals.

Resistance to Vanadium Poisoning With Lanthanum

Many tests have confirmed that deposition, or precipitation presumably as rare earth oxide gel, as compared with ion exchange, of lanthanum in the matrix, is able to reduce the deleterious effect of vanadium. FIG. VII shows the effect of lanthanum in protecting the catalyst from deactivation by vanadium.

High Light Cycle Oil/Heavy Cycle Oil Ratio

Previously, when the price of crude oil was much lower, the price of heavy fuel oil was not far removed from the value of other petroleum feedstocks and products. Today, however, the value of #6 fuel is considerably below the price of crude and refinery products and including more valuable light cycle oil which prior to the development of this process had to be added to vacuum bottoms distilled from crude oil, in order to meet viscosity requirements, thereby also depreciating the value of light cycle oil which when incorporated into light heating oil has a much higher value. Because of these economic factors it is desirable to produce as little slurry oil as possible. Careful study of the chemical composition of slurry oil surprisingly showed it to be a combination of mainly polynuclear aromatic molecules, no longer susceptible to cracking, and a second portion highly paraffinic. Based on this analysis, further major effort was placed in also developing a catalyst able to greatly reduce slurry oil yield by intensifying appreciably the acidity of the matrix over those catalysts available at the present time. The results shown in FIG. VI testify to the success of this catalyst in meeting this objective. This property alone greatly increases the economic value of the product and process.

Balancing Properties

An HY zeolite is well known for its ability to produce a high octane product and low coke. The high octane has been explained as being due to the inability of HY to transfer hydrogen back to high octane olefins produced in the cracking reaction. By the same token, an inability to strip hydrogen from the feed apparently results in production of less coke from butadiene and polynuclear aromatic production. Rare earth exchanged sieves, on the other hand, appear to produce more coke and lower octane number by causing an acceleration of these reactions.

On the other hand, rare earth exchanged zeolites have been demonstrated to be more active, more stable to temperature and steam and more resistant to metals degradation. We have discovered that a very delicate, narrow and optimum balance between these extremes, results in a catalyst which possesses the best characteristics of both HY and rare earth exchanged Y sieves. This balance was carefully explored and an optimum arrived at by many experiments, followed by pilot runs in the 200 B/D demonstration unit.

FIGS. X and XI illustrate the effect of varying the rare earth content of a zeolite in an inorganic oxide matrix. As the rare earth content increases catalyst activity and gas-coke mode increases. However, gasoline yield is optimized at 2.5–3.5 wt % rare earth oxides which is approximately 30–60% of total exchange capacity.

Additional Materials

The process of the present invention may be operated with the above described carbo-metallic oil and catalyst, and with recycled sour water as substantially the only additional material charged to the reaction zone. But the charging of other additional materials is not excluded. The charging of recycled oil to the reaction zone has already been mentioned. As described in greater detail below, still other additional materials fulfilling a variety of functions may also be charged.

Added materials may be introduced into the process in any suitable fashion, some examples of which follow. For instance, they may be admixed with the carbo-metallic oil feedstock prior to contact of the latter with the catalyst. Alternatively, the added materials may, if desired, be admixed with the catalyst prior to contact of the latter with the feedstock. Separate portions of the added materials may be separately admixed with both catalyst and carbo-metallic oil. Moreover, the feedstock, catalyst and additional materials may, if desired, be brought together substantially simultaneously. A portion of the added materials may be mixed with catalyst and/or carbo-metallic oil in any of the above described ways, while additional portions are subsequently brought into admixture. For example, a portion of the added materials may be added to the carbo-metallic oil and/or to the catalyst before they reach the reaction zone, while another portion of the added materials is introduced directly into the reaction zone. The added materials may be introduced at a plurality of spaced locations in the reaction zone or along the length thereof, if elongated.

The amount of additional materials which may be present in the feed, catalyst or reaction zone for carrying out the above functions, and others, may be varied as desired; but said amount will preferably be sufficient to substantially heat balance the process. These materials may for example be introduced into the reaction zone in a weight ratio relative to feed of up to about 0.4, preferably in the range of about 0.04 to about 0.4, more preferably about 0.04 to about 0.3 and most preferably about 0.05 to about 0.25.

The addition of steam to the reaction zone is frequently mentioned in the literature of fluid catalytic cracking. Addition of liquid water to the feed is discussed relatively infrequently, compared to the introduction of steam directly into the reaction zone. However, in accordance with the present invention it is particularly preferred that liquid water be brought into intimate admixture with the carbo-metallic oil in a weight ratio of about 0.04 to about 0.15 at or prior to the time of introduction of the oil into the reaction zone, whereby the water (e.g., in the form of liquid water or in the form of steam produced by vaporization of liquid water in contact with the oil) enters the reaction zone as part of the flow of feedstock which enters such zone. Although not wishing to be bound by any theory, it is believed that the foregoing is advantageous in promoting dispersion of the feedstock. Also, the heat of vaporization of the water, which heat is absorbed from the catalyst, from the feedstock, or from both, causes the water to be a more efficient heat sink than steam alone. Preferably the weight ratio of liquid water to feed is about 0.04 to about 0.15, more preferably about 0.05 to about 0.10.

Of course, the liquid water may be introduced into the process in the above described manner or in other ways, and in either event the introduction of liquid water amd recycled, condensed sour water, may be accompanied by the introduction of additional amounts of water as steam into the same or different portions of the reaction zone or into the catalyst and/or feedstock. For example, the amount of additional steam may be in a weight ratio relative to feed in the range of about 0.01 to about 0.25, with the weight ratio of total $H_2O$ (as steam and liquid water) to feedstock being about 0.3 or less. The charging weight ratio of liquid water relative to steam in such combined use of liquid water and steam may thus range from about 5 to about 0.1. Such ratio may be maintained at a predetermined level within such range or varied as necessary or desired to adjust or maintain the heat balance of the reaction.

Other materials may be added to the reaction zone to perform one or more of the above described functions. For example, the dehydrogenation-condensation activity of heavy metals may be inhibited by introducing hydrogen sulfide gas into the reaction zone. Hydrogen may be made available for hydrogen deficient carbo-metallic oil feedstocks by introducing into the reaction zone, hydrogen gas or a conventional hydrogen donor diluent such as a heavy naphtha or relatively low molecular weight carbon-hydrogen fragment contributors, including for example: light paraffins; low molecular weight alcohols and other compounds which permit or favor intermolecular hydrogen transfer; and compounds that chemically combine to generate hydrogen in the reaction zone such as by reaction of reduced metal with water, reaction of carbon monoxide with water, or with alcohols, or with olefins, or with other materials or mixtures of the foregoing.

All of the above mentioned additional materials (including water) alone or in conjunction with each other or in conjunction with other materials, such as nitrogen or other inert gases, light hydrocarbons, and others, may perform any of the above-described functions for which they are suitable, including without limitation, acting as diluents to reduce feed partial pressure and/or as heat sinks to absorb heat present in the catalyst as received from the regeneration step. The foregoing is a discussion of some of the functions which can be performed by materials other than catalyst and carbo-metallic oil feedstock introduced into the reaction zone, and it should be understood that other materials may be added or other functions performed without departing from the spirit of the invention.

Illustrative Apparatus

The invention may be practiced in a wide variety of apparatus. However, the preferred apparatus includes means for rapidly vaporizing as much feed as possible and efficiently admixing feed, water and catalyst (although not necessarily in that order), for causing the resultant mixture to flow as a dilute suspension in a progressive flow mode, and for separating the catalyst from cracked products and any uncracked or only partially cracked feed at the end of a predetermined residence time or times, it being preferred that all or at least a substantial portion of the product should be abruptly separated from at least a portion of the catalyst.

For example, the apparatus may include, along its elongated reaction chamber, one or more points for introduction of catalyst, one or more points for introduction of additional materials including water, one or more points for withdrawal of products and one or more points for withdrawal of catalyst. The means for introducing feed, catalyst and other material may range from open pipes to sophisticated jets or spray nozzles, it being preferred to use means capable of breaking up the liquid feed into fine droplets or foam. Preferably, the catalyst, liquid water (when used) and fresh feed are brought together in an apparatus similar to that disclosed in U.S. patent application Ser. No. 969,601 of George D. Myers et al, filed Dec. 14, 1978, the entire disclosure of which is hereby incorporated herein by reference.

It is preferred that the reaction chamber, or at least the major portion thereof, be more nearly vertical than horizontal and have a length to diameter ratio of at least about 10 more preferably about 20 or 25 or more. Use of a vertical riser type reactor is preferred. If tubular, the reactor can be of uniform diameter throughout or may be provided with a continuous or step-wise increase in diameter along the reaction path to maintain or vary the velocity along the flow path.

In general, the charging means (for catalyst, water and feed) and the reactor configuration are such as to provide a relatively high velocity of flow and dilute suspension of catalyst. For example, the vapor or catalyst velocity in the riser will be usually at least about 25 and more typically at least about 35 feet per second. This velocity may range up to about 55 or about 75 feet per second or higher. The velocity capabilities of the reactor will in general be sufficient to prevent substantial build-up of a catalyst bed in the bottom or other portions of the riser, whereby the catalyst loading in the riser can be maintained below about 4 or 5 pounds and below about 2 pounds per cubic foot, respectively, at the upstream (e.g. bottom) and downstream (e.g. top) ends of the riser.

The progressive flow mode involves, for example, flowing of catalyst, feed and steam as a stream in a positively controlled and maintained direction established by the elongated nature of the reaction zone. This is not to suggest however that there must be strictly linear flow. As is well known, turbulent flow and "slippage" of catalyst may occur to some extent especially in certain ranges of vapor velocity and some catalyst loadings, although it has been reported adviseable to employ sufficiently low catalyst loadings to restrict slippage and back-mixing.

Most preferably the reactor is one which abruptly separates a substantial portion of all of the vaporized cracked products from the catalyst at one or more points along the riser, and preferably separates substantially all of the vaporized cracked products from the catalyst at the downstream end of the riser. The process of the present invention uses ballistic separation of catalyst and products; that is, catalyst is projected in a direction established by the riser tube, and is caused to continue its motion in the general direction so established, while the products, having lesser momentum, are caused to make an abrupt change of direction, resulting in an abrupt, substantially instantaneous separation of product from catalyst. In a preferred embodiment referred to as a vented riser, the riser tube is provided with a substantially unobstructed discharge opening at its downstream end for discharge of catalyst. An exit port in the side of the tube adjacent the downstream end receives the products. The discharge opening communicates with a catalyst flow path which extends to the usual stripper and regenerator, while the exit port communicates with a product flow path which is substantially or entirely separated from the catalyst flow path and leads to separation means for separating the products from the relatively small portion of catalyst, if any, which manages to gain entry to the product exit port. Examples of a ballistic separation apparatus and technique as above described, are found in U.S. Pat. No. 4,066,533 and 4,070,159 to Myers et al, the disclosures of which patents are hereby incorporated herein by reference to their entireties.

Preferred Operating Conditions

Preferred conditions for operation of the process are described below. Among these are feed, catalyst and reaction and feed pressures, residence time and levels of conversion, coke production and coke laydown on catalyst.

Feedstock Temperature

In conventional FCC operations with VGO, the feedstock is customarily preheated, often to temperatures significantly higher than are required to make the feed sufficiently fluid for pumping and for introduction into the reactor. For example, preheat temperatures as high as about 371° C. or 427° C. (about 700° F. or 800° F.) have been reported. But in our process as presently practiced it is preferred to restrict preheating of the feed, so that the feed is capable of absorbing a larger amount of heat from the catalyst while the catalyst raises the feed to conversion temperature, at the same time minimizing utilization of external fuels to heat the feedstock. Thus, where the nature of the feedstock permits, it may be fed at ambient temperature. Heavier stocks may be fed at preheat temperatures of up to about 316° C. (about 600° F.), typically about 93° C. (about 200° F.) to about 260° C. (about 500° F.), but higher preheat temperatures are not necessarily excluded.

Catalyst Temperature

The catalyst fed to the reactor may vary widely in temperature, for example from about 482° C. (about 900° F.) to about 871° C. (about 1600° F.), more preferably about 649° C. to about 815° C. (about 1200° F. to about 1500° F.) and most preferably about 704° C. to about 760° C. (about 1300° F. to about 1400° F.), with about 718° C. to about 746° C. (about 1325° F. to about 1375° F.) being considered optimum at present.

Reactor Temperature

As indicated previously, the conversion of the carbometallic oil to lower molecular weight products may be conducted at a temperature of about 482° C. (about 900° F.) to about 760° C. (1400° F.), measured at the reaction chamber outlet. The reaction temperature as measured at said outlet is more preferably maintained in the range of about 524° C. to about 704° C. (about 900° F. to about 1200° F.), still more preferably about 529° C. to about 649° C. (about 925° F. to about 1050° F.) and most preferably about 538° C. to about 621° C. (about 950° F. to about 1025° F.). Depending upon the temperature selected and the properties of the feed, a considerable portion of the feed may or may not vaporize in the riser and must therefore be partially cracked catalytically so as to achieve vaporization.

Pressure

Although the pressure in the reactor may, as indicated above, range from about 10 to about 50 psia, preferred and more preferred pressure ranges are about 15 to about 35 and about 20 to about 35. In general, the partial (or total) pressure of the feed may be in the range of about 3 to about 30, more preferably about 7 to about 25 and most preferably about 10 to about 17 psia. The feed partial pressure may be controlled or suppressed by the introduction of gaseous (including vaporous) materials into the reactor, such as for instance the steam, water, and other additional materials described above. The process has for example been operated with the ratio of feed partial pressure relative to total pressure in the riser in the range of about 0.2 to about 0.8 more typically about 0.3 to about 0.7 and still more typically about 0.4 to about 0.6, with the ratio of the partial pressure of added gaseous material (which includes the steam resulting from introduction of $H_2O$ to the riser and may also include recycled gases) relative to total pressure in the riser correspondingly ranging from about 0.8 to about 0.2, more typically about 0.7 to about 0.3 and still more typically about 0.6 to about 0.4. In the illustrative operations just described, the ratio of the partial pressure of the added gaseous material relative to the partial pressure of the feed has been in the range of about 0.25 to about 4, more typically about 0.4 to about 2.3 and still more typically about 0.7 to about 1.7.

Residence Time

Although the residence time of feed and product vapors in the riser may be in the range of about 0.5 to about 10 seconds, as described above, preferred and more preferred values are about 0.5 to about 6 and about 1 to about 4 seconds, with about 0.5 to about 3.0 seconds currently being considered about optimum. For example, the process has been operated with a riser vapor residence time of about 2.5 seconds or less by introduction of copious amounts of gaseous materials into the riser, such amounts being sufficient to provide for example a partial pressure ratio of added gaseous materials relative to hydrocarbon feed of about 0.8 or more. By way of further illustration, the process has been operated with said residence time being about two seconds or less, with the aforesaid ratio being in the range of about 1 to about 2. The combination of low feed partial pressure, very low residence time and ballistic separation of products from catalyst are considered especially beneficial for the conversion of carbo-metallic oils. Additional benefits may be obtained in the foregoing combination when there is a substantial partial pressure of added gaseous material, especially $H_2O$, as described above.

Conversion

In general, the combination of catalyst to oil ratio, temperatures, pressures and residence times should be such as to effect a substantial conversion of the carbo-metallic oil feedstock. It is an advantage of the process that very high levels of conversion can be attained in a single pass; for example the conversion may be in excess of 50% and may range to about 90% or higher. Preferably, the aforementioned conditions are maintained at levels sufficient to maintain conversion levels in the range of about 60 to about 90% and more preferably about 70 to about 85%. The foregoing conversion levels are calculated by substracting from 100% the percentage obtained by dividing the liquid volume of fresh feed into 100 times the volume of remaining liquid product which boils at and above 221° C. (430° F.) (tbp, standard atmospheric pressure).

These substantial levels of conversion may and usually do result in relatively large yields of coke, such as for example about 5 to about 18% by weight based on fresh feed, more commonly about 6 to about 17% and most frequently about 7 to about 16%. The coke yield can more or less quantitatively deposit upon the catalyst. At contemplated catalyst to oil ratios, the resultant coke laydown may be in excess of about 0.3, more commonly in excess of about 0.5 and very frequently in excess of about 1% of coke by weight, based on the weight of moisture free regenerated catalyst. Such coke laydown may range as high as about 2%, or about 3%, or even higher.

Catalyst Separation

In certain types of known FCC units, there is a riser which discharges catalyst and product vapors together into an enlarged chamber, usually considered to be part of the reactor, in which the catalyst is disengaged from product and collected. Continued contact of catalyst, uncracked feed (if any) and cracked products in such enlarged chamber results in an overall catalyst feed contact time appreciably exceeding the riser tube residence times of the vapors and catalysts. When practicing the process of the present invention with ballistic separation of catalyst and vapors at the downstream (e.g. upper) extremity of the riser, such as is taught in the above mentioned Myers et al patents, the riser residence time and the catalyst contact time are substantially the same for a major portion of the feed and product vapors. It is considered advantageous if the vapor riser residence time and vapor catalyst contact time are substantially the same for at least about 80%, more preferably at least about 90% and most preferably at least about 95% by volume of the total feed and product vapors passing through the riser. By denying such vapors continued contact with catalyst in a catalyst disengagement and collection chamber one may avoid a tendency toward re-cracking of gasoline and diminished selectivity.

The abrupt separation of catalyst from product vapors and unconverted feed (if any) is also of great assistance. It is for this reason that the so-called vented riser apparatus and technique disclosed in U.S. Pat. Nos. 4,070,159 and 4,066,533 to George D. Myers et al is the preferred type of apparatus for conducting this process. For similar reasons, it is beneficial to reduce insofar as possible the elapsed time between separation of catalyst from product vapors and the commencement of stripping. The vented riser and prompt stripping tend to reduce the opportunity for coking of unconverted feed and higher boiling cracked products absorbed on the catalyst.

Stripping

In common with conventional FCC operations on VGO, the present process includes stripping of spent catalyst after disengagement of the catalyst from product vapors. Persons skilled in the art are acquainted with appropriate stripping agents and conditions for stripping spent catalyst, but in some cases the present process may require somewhat more severe conditions than are commonly employed. This may result, for example, from the use of a carbo-metallic oil having constituents which do not volatilize under the conditions prevailing in the reactor, and instead remain deposited on the catalyst. Such absorbed, unvaporized material potentially capable of being converted to valuable products is instead transported to the regenerator, resulting in excessive, low valued catalytic coke equivalents. Also, to minimize regeneration temperatures and demand for regeneration capacity, it may be desirable to intensify conditions of time, temperature and atmosphere in the stripper which are thereby sufficient to reduce potentially volatile hydrocarbon material borne by the stripped catalyst to about 10% or less by weight of the total carbon loading on the catalyst. Such stripping may for example include reheating of the catalyst, extensive stripping with steam, the use of gases having a temperature considered higher than normal for FCC/VGO operations, such as for instance flue gas from the regenerator, as well as other refinery stream gases such as hydrotreater off-gas ($H_2S$ containing), hydrogen and others. For example, the stripper may be operated at a temperature of about 552° C. (about 1025° F.) or higher.

Heat Control

One or a combination of techniques may be utilized in this invention for controlling or restricting the amount of regeneration heat transmitted via catalyst to fresh feed. For example, one may add a combustion promotor to the cracking catalyst in order to reduce the temperature of combustion of coke to carbon dioxide and/or carbon monoxide in the regenerator. Moreover, one may remove heat from the catalyst through heat exchange means, including for example heat exchangers (e.g. steam coils) built into the regenerator itself, whereby one may extract heat from the catalyst during regeneration. Heat exchangers can be built into catalyst transfer lines, such as for instance the catalyst return line from the regenerator to the reactor, whereby heat may be removed from the catalyst after it is regenerated. The amount of heat imparted to the catalyst in the regenerator may be restricted by reducing the amount of insulation on the regenerator to permit some heat loss to the surrounding atmosphere, especially if feeds of exceedingly high coking potential are planned for processing; in general, however, such loss of heat to the atmosphere is considered economically less desirable than certain of the other alternatives set forth herein. One may also inject cooling fluids into the regenerator, for example water and/or stream, whereby the amount of inert gas available in the regenerator for heat absorption and removal is increased.

$CO/CO_2$ Ratio

Whether practiced with the foregoing techniques or not, the present invention includes the technique of controlling or restricting the heat transmitted to fresh feed via recycled regenerated catalyst while maintaining a specified ratio between the carbon dioxide and carbon monoxide formed in the regenerator while such gases are in heat exchange contact or relationship with catalyst undergoing regeneration. In general, all or a major portion by weight of the coke present on the catalyst immediately prior to regeneration is removed in at least one combustion zone in which the aforesaid ratio is controlled as described below. More particularly, at least the major portion more preferably at least about 65% and more preferably at least about 80% by weight of the coke on the catalyst is removed in a combustion zone in which the molar ratio of $CO_2$ to CO is maintained at a level substantially below 5, e.g. about 4 or less. Looking at the $CO_2/CO$ relationship from the inverse standpoint, it is preferred that the $CO/CO_2$ molar ratio should be at least about 0.25 and preferably at least about 0.3 and still more preferably about 1 or more or even 1.5 or more. While persons skilled in the art are aware of techniques for inhibiting the burning of CO to $CO_2$, it has generally been suggested that the mole ratio of $CO:CO_2$ should be kept less than 0.2 when regenerating catalyst with large heavy metal accumulations resulting from the processing of carbo-metallic oils; in this connection see for example U.S. Pat. No. 4,162,213 to Zrinscak, Sr. et al. In this invention however, maximizing CO production while regenerating catalyst to about 0.1% carbon or less, and preferably about 0.05% carbon or less, is a particularly preferred embodiment of this invention. Moreover, according to a preferred method of carrying out the invention the sub-process of regeneration, as a whole, may be carried out to the above-mentioned low levels of carbon on regenerated catalyst with a deficiency of oxygen; more specifically, the total oxygen supplied to the one or more stages of regeneration can be and preferably is less than the stoichiometric amount which would be required to burn all hydrogen in the coke to $H_2O$ and to burn all carbon in the coke to $CO_2$. If the coke includes other combustibles, the aforementioned stoichiometric amount can be adjusted to include the amount of oxygen required.

Still another particularly preferred technique for controlling or restricting the regeneration heat imparted to fresh feed via recycled catalyst involves the diversion of a portion of the heat borne by recycled catalyst to added materials introduced into the reactor, such as the water, steam, naphtha, other hydrogen donors, flue gases, inert gases, and other gaseous or vaporizable materials which may be introduced into the reactor.

The larger the amount of coke which must be burned from a given weight of catalyst, the greater the potential for exposing the catalyst to excessive temperatures. Many otherwise desirable and useful cracking catalysts are particularly susceptible to deactivation at high temperatures, and among these are quite a few of the costly molecular sieve or zeolite types of catalyst. FIG. XIII illustrates the improved hydrothermal properties of the catalyst of this invention as compared to conventional zeolite containing cracking catalysts. The crystal structures of zeolites and the pore structures of the catalyst carriers generally are somewhat susceptible to thermal and/or hydrothermal degradation. The use of such catalysts in catalytic conversion processes for carbo-metallic feeds also creates a need for regeneration techniques which will not destroy the catalyst by exposure to highly severe temperatures and steaming. Such need can be met by a multi-stage regeneration process which includes conveying spent catalyst into a first regeneration zone and introducing oxidizing gas thereto. The amount of oxidizing gas that enters said first zone and the concentration of oxygen or oxygen bearing gas therein are sufficient for only partially effecting the desired conversion of coke on the catalyst to carbon oxide gases. The partially regenerated catalyst is then removed from the first regeneration zone and is conveyed to a second regeneration zone. Oxidizing gas is introduced into the second regeneration zone to provide a higher concentration of oxygen or oxygen-containing gas than in the first zone, to complete the removal of carbon to the desired level. The regenerated catalyst may then be removed from the second zone and recycled to the reactor for contact with fresh feed. An example of such multi-stage regeneration process is described in U.S. patent application Ser. No. 969,602 of George D. Myers et al, filed Dec. 14, 1978, the entire disclosure of which is hereby incorporated herein by reference. Another example may be found in U.S. Pat No. 4,332,673.

Multi-stage regeneration offers the possibility of combining oxygen deficient regeneration with the control of the $CO:CO_2$ molar ratio. Thus, about 50% or more, more preferably about 65% to about 95%, and more preferably about 80% to about 95% by weight of the coke on the catalyst immediately prior to regeneration may be removed in one or more stages of regeneration in which the molar ratio of $CO:CO_2$ is controlled in the manner described above. In combination with the foregoing, the last 5% or more, or 10% or more by weight of the coke originally present, up to the entire amount of coke remaining after the preceding stage or stages, can be removed in a subsequent stage of regeneration in which more oxygen is present. Such process is susceptible of operation in such a manner that the total flue gas recovered from the entire, completed regeneration operation contains little or no excess oxygen, i.e. on the order of about 0.2 mole percent or less, or as low as about 0.1 mole percent or less, which is substantially less than the 2 mole percent which has been suggested elsewhere. Thus, multi-stage regeneration is particularly beneficial in that it provides another convenient technique for restricting regeneration heat transmitted to fresh feed via regenerated catalyst and/or reducing the potential for thermal deactivation, while simultaneously affording an opportunity to reduce the carbon level on regenerated catalyst to those very low percentages (e.g. about 0.1% or less) which particularly enhance catalyst activity. Moreover, where the regeneration conditions, e.g. temperature or atmosphere, are substantially more severe in the second zone than in the first zone (e.g. by at least 6° C. (about 10° F.) and preferably at least about 11° C. (about 20° F.)), that part of the regeneration sequence which involves the most severe conditions is performed while there is little or no hydrogen in the coke on the catalyst. Such operation may provide some protection of the catalyst from the more severe conditions. A particularly preferred embodiment of the invention is two-stage fluidized regeneration at a maximum temperature of at least about 6° C. or 11° C. (about 10° F. or 20° F.) higher in the dense phase of the second stage as compared to the dense phase of the first stage, and with reduction of carbon on catalyst to about 0.05% or less or even about 0.025% or less by weight in the second zone. In fact, catalyst can readily be regenerated to carbon levels as low as 0.01% by this technique, even though the carbon on catalyst prior to regeneration is as much as about 1% or greater.

EXAMPLES

Example 1

Preparation of a Catalyst of the Invention

1. Into a large tank is added 80.7 kg of sodium silicate. The silicate, containing 28.7 wt. % $SiO_2$, was mixed with 435 liters of water to achieve a 4.5 wt. % $SiO_2$ solution.
2. A medium coarse Georgia kaolinite clay in the amount of 46.6 kg is added with mixing to the dilute silicate solution.
3. In order to form silica-alumina gel, a kg water solution containing 16.3 kg of aluminum sulfate hydrate is added to the silicate-clay mixture to achieve a pH of approximately 9.5. The resultant slurry was held at 49° C. (120° F.) for 15 minutes.
4. Next, a water solution containing 9.6 kg of sodium aluminate is added to the slurry to raise the pH to approximately 12.0 and the resultant slurry was held at 49° C. (120° F.) for 30 minutes.
5. A solution containing 54.2 kg of aluminum sulfate hydrate is added to the slurry to reduce the pH to approximately 3.5.
6. The pH is then raised to 6.0 with $NH_4OH$.
7. A pH 6 water slurry containing 15.4 kg of an ultrastable Y zeolite such as USZ-14 is added to the slurry from step 6.
8. The resultant slurry is dewatered to obtain a slurry containing 15 wt. % solids before spray drying to produce a microspherical catalyst.
9. The catalyst is reslurried with water, then washed at pH 6 with dilute water solutions containing ammonium ions.
10. The washed catalyst is exchanged at 38° C. (100° F.) with water solutions of ammonium sulfate before washing again.
11. Finally the catalyst is exchanged with a water solution of mixtured rare earth chlorides at a pH of 5.2 and a temperature of approximately 38° C. (approximately 100° F.) before drying at 177° C. (350° F.) for 30 minutes.

Example 2

Preparation of Second Catalyst of the Invention

1. Water is mixed with 16 Kg of a ultrastable zeolite such as USZ-14 to make an approximately 30–40% slurry. A Rare Earth chloride solution containing 0.85 kg of rare earth oxides is added to the zeolite slurry. The resultant zeolite slurry is held at room temperature for use in Step 4.
2. Into a large tank is added 80.7 kg of sodium silicate. The silicate, containing 28.7 wt % $SiO_2$, was mixed with 435 liters of water to achieve 4.5 wt % $SiO_2$ solution.
3. A medium coarse Georgia kaolinite clay in the amount of 46.6 kg is added with mixing to the dilute silicate solution.
4. A water slurry containing the partially rare earth exchanged ultrastable Y zeolite from Step 1 is added with mixing to the slurry of Step 2.
5. In order to form silica-alumina gel, a water solution containing 16.3 kg of aluminum sulfate hydrate is added to the silicate-clay mixture to the silicate-clay mixture to achieve a pH of approximately 9.5. The resultant slurry was held at 32° C. (90° F.) for 15 minutes.
6. Next, a water solution containing 9.6 kg of sodium aluminate is added to the slurry to raise the pH to approximately 12.0 and the resultant slurry was held at 32° C. (90° F.) for 30 minutes.
7. A solution containing 60.0 kg of aluminum sulfate hydrate is added to the slurry to reduce the pH to approximately 3.5.
8. The pH is then raised to approximately 6.0 with $NH_4OH$.
9. The resultant slurry is dewatered to obtain a slurry containing 15 wt % solids before spray drying to produce a microspherical catalyst.
10. The catalyst is reslurried with water, then washed at pH 6 with dilute water solutions containing ammonium ions.
11. The washed catalyst is exchanged at 38° C. (100° F.) with water solutions of ammonium sulfate before washing again.
12. Finally the catalyst is exchanged with a water solution of mixtured rare earth chlorides with a high La/Ce ratio at a pH of 5 and a temperature of approximately 38° C. (approximately 100° F.) before drying at 177° C. (350° F.) for 30 minutes.

Catalyst Performance

Catalysts having the aforementioned characteristics are able to perform exceptionally well under severe operating conditions and on poor quality feedstocks. Following are results based on experimental runs, on a 200 B/D demonstration unit performed on a preferred catalyst (Table VI), on a residual feedstock, possessing the properties shown in Table V, and compared with several catalysts (Table VI) commercially available, normally used for processing vacuum gas oil. The considerable increase in gasoline and the equally significant reduction in coke and slurry oil at essentially equal conversion is apparent as shown in FIGS. I through VI.

TABLE V

| FEED | Feeds | |
|---|---|---|
| | ABL | 735 TANK MIXED REDUCED CRUDES |
| API Gravity at 16° C. (60° C.) | 18.6 | 18.7 |
| Characterization Factor | 11.80 | 11.54 |
| Ramsbottom Carbon, Wt. % | 5.6 | 6.1 |
| Sulfur Content, Wt. % | 2.68 | 2.1 |
| Nickel Content, ppm | 10.0 | 15.0 |
| Vanadium Content, ppm | 25.0 | 75.0 |
| Basic Nitrogen, Wt. % | 0.0450 | 0.0630 |
| Iron Content, ppm | 8.0 | 3.0 |
| Distillation (D-1160) (10%) | 716° F. | 620° F. |

TABLE V-continued

| | Feeds | |
|---|---|---|
| FEED | ABL | 735 TANK MIXED REDUCED CRUDES |
| (50%) | 825° F. | 862° F. |
| (80%) | 944° F. | 982° F. |

TABLE VI

| | Products | | | | |
|---|---|---|---|---|---|
| FEED TYPE | Conventional | | Invention | | |
| ARABIAN LIGHT | | | | | |
| Catalyst Prep.: Example | — | — | 2 | 1 | 1 |
| | #1 | #2 | — | — | — |
| Catalyst Type | | | | | |
| Conversion, vol. % | 77.1 | 78.6 | 81.2 | 77.6 | 80.0 |
| Dry Gas FOE | 7.4 | 7.7 | 8.1 | 7.6 | 7.3 |
| Propylene, vol. % | 8.4 | 9.0 | 8.8 | 8.0 | 8.6 |
| Propane, vol. % | 3.9 | 5.1 | 4.3 | 3.4 | 3.8 |
| Butylenes, vol. % | 8.8 | 8.7 | 10.9 | 10.8 | 11.1 |
| Butanes, vol. % | 7.7 | 10.8 | 8.0 | 4.7 | 6.2 |
| Gasoline, vol. % | 48.0 | 46.4 | 51.3 | 53.9 | 53.7 |
| LCO, vol. % | 8.4 | 5.8 | 8.8 | 12.1 | 10.1 |
| Slurry, vol. % | 14.5 | 15.6 | 10.0 | 10.3 | 9.9 |
| Coke, wt. % | 13.8 | 13.9 | 12.9 | 11.6 | 11.9 |
| Selectivity $\frac{\text{Vol \% Gaso.}}{\text{Vol \% Conv.}} \times 100$ | 62 | 59 | 63 | 69 | 67 |
| METALS ON CATALYST | | | | | |
| Nickel on Catalyst, ppm | 1100 | | | | |
| Vanadium on Catalyst, ppm | 6900 | | | | |
| Incremental Sodium on Cat. Wt. %. | 0.54 | | | | |
| Incremental Iron on Cat., ppm | 1134 | | | | |

TABLE VII

| | Products | | | |
|---|---|---|---|---|
| FEED TYPE | ARABIAN LIGHT CRUDE (ABL) | | FROM 735 TANK (MIXED REDUCED CRUDES) | |
| Catalyst Prep, Example | 1 | CONVENTIONAL | 1 | CONVENTIONAL |
| Conversion, vol. % | 77.6 | 77.01 | 77.4 | 76.7 |
| Dry Gas FOE* | 7.6 | 7.4 | 5.8 | 5.9 |
| Propylene, vol. % | 8.0 | 8.4 | 8.5 | 9.6 |
| Propane, vol. % | 3.4 | 3.9 | 2.6 | 3.6 |
| Butylenes, vol. % | 10.8 | 8.8 | 10.6 | 8.6 |
| Butanes, vol. % | 4.7 | 7.7 | 4.7 | 8.0 |
| Gasoline, vol. % | 53.9 | 48.0 | 54.0 | 48.1 |
| LCO, vol. % | 12.1 | 8.4 | 13.1 | 9.3 |
| Slurry, vol. % | 10.3 | 14.5 | 9.5 | 14.0 |
| Coke, wt. % | 11.6 | 13.8 | 12.4 | 13.9 |
| LCO/Slurry Oil Ratio | 1.12 | 0.58 | 1.38 | 0.66 |
| Volume Gain | 10.8 | 7.1 | 8.8 | 7.1 |
| Gasoline Sel. | 0.69 | 0.62 | 0.70 | 0.63 |
| Conversion, wt. % | 76.8 | 75.7 | 76.3 | 75.2 |
| Dry Gas, wt. % | 6.3 | 6.2 | 4.9 | 4.9 |

*FOE = Fuel Oil Equivalents, see "R" under "Catalyst Regeneration".

TABLE VIII

| 735 Tank - Mixed Reduced Crudes | | | | |
|---|---|---|---|---|
| FEED TYPE | Invention | CONVENTIONAL | | |
| CATALYST TYPE | Catalyst - Example 2 | OX | #2 | #1 |
| Conversion Vol. % | 81.4 | 79.4 | 79.1 | 78.3 |
| Dry Gas | 4.0 | 6.1 | 5.4 | 4.2 |
| Propylene | 2.2 | 10.7 | 9.4 | 9.8 |
| Propane | 9.6 | 3.1 | 2.5 | 4.1 |
| Butylene | 11.1 | 8.7 | 9.1 | 9.2 |
| Butane | 5.6 | 7.3 | 6.6 | 11.0 |
| Gasoline - Vol. % | 54.4 | 48.5 | 51.0 | 45.6 |
| LCO - Vol. % | 11.5 | 11.0 | 10.2 | 7.9 |
| Slurry - Vol. % | 7.2 | 9.6 | 10.7 | 13.8 |
| Coke - Wt. % | 15.5 | 15.4 | 15.2 | 15.5 |
| LCO/Slurry - Ratio | 1.6 | 1.15 | 0.95 | 0.57 |
| Gasoline Selectivity | 67.0 | 61.1 | 64.4 | 58.2 |

Similarly, correlations based on 200 B/D runs on two different, highly carbo-metallic reduced crudes with a catalyst (Example 1) of this invention and one considered optimum for vacuum gas oil, is shown in Table VII. Again the contrast in yield is quite apparent. It can be appreciated that these differences in yield represent major economic differences.

In Table VIII, another catalyst of this invention (Example 2) is compared to several commercially available catalysts utilized in vacuum gas oil conversion. The catalyst of this invention prepared by Example 2 showed increased conversion, higher gasoline yields and selectivities, lower slurry make and a higher LCO/slurry ratio than the conventional catalysts.

Example 3

Conversion Unit Run Using the Catalyst of Example 1

Figure 2:
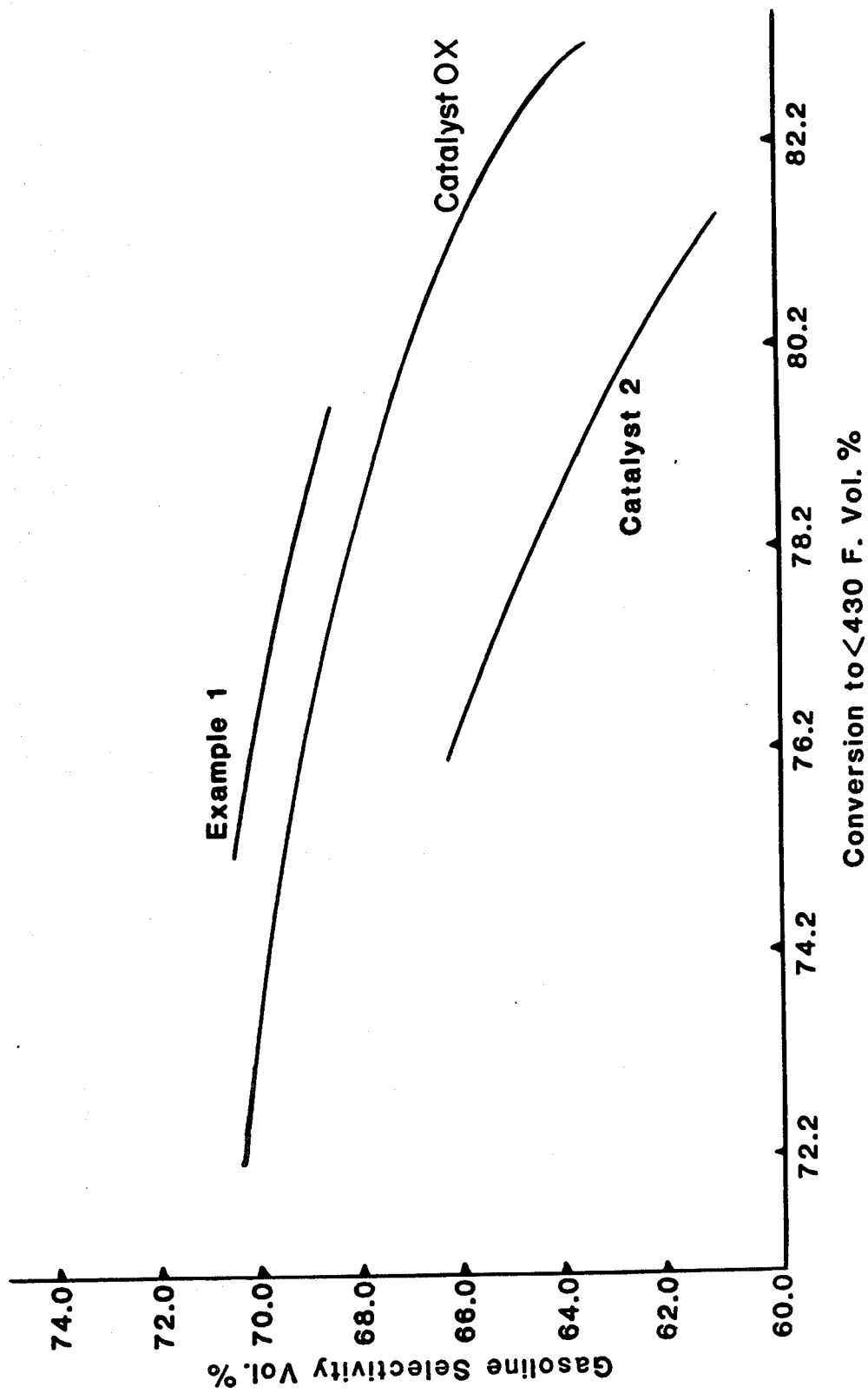
Figure 3:
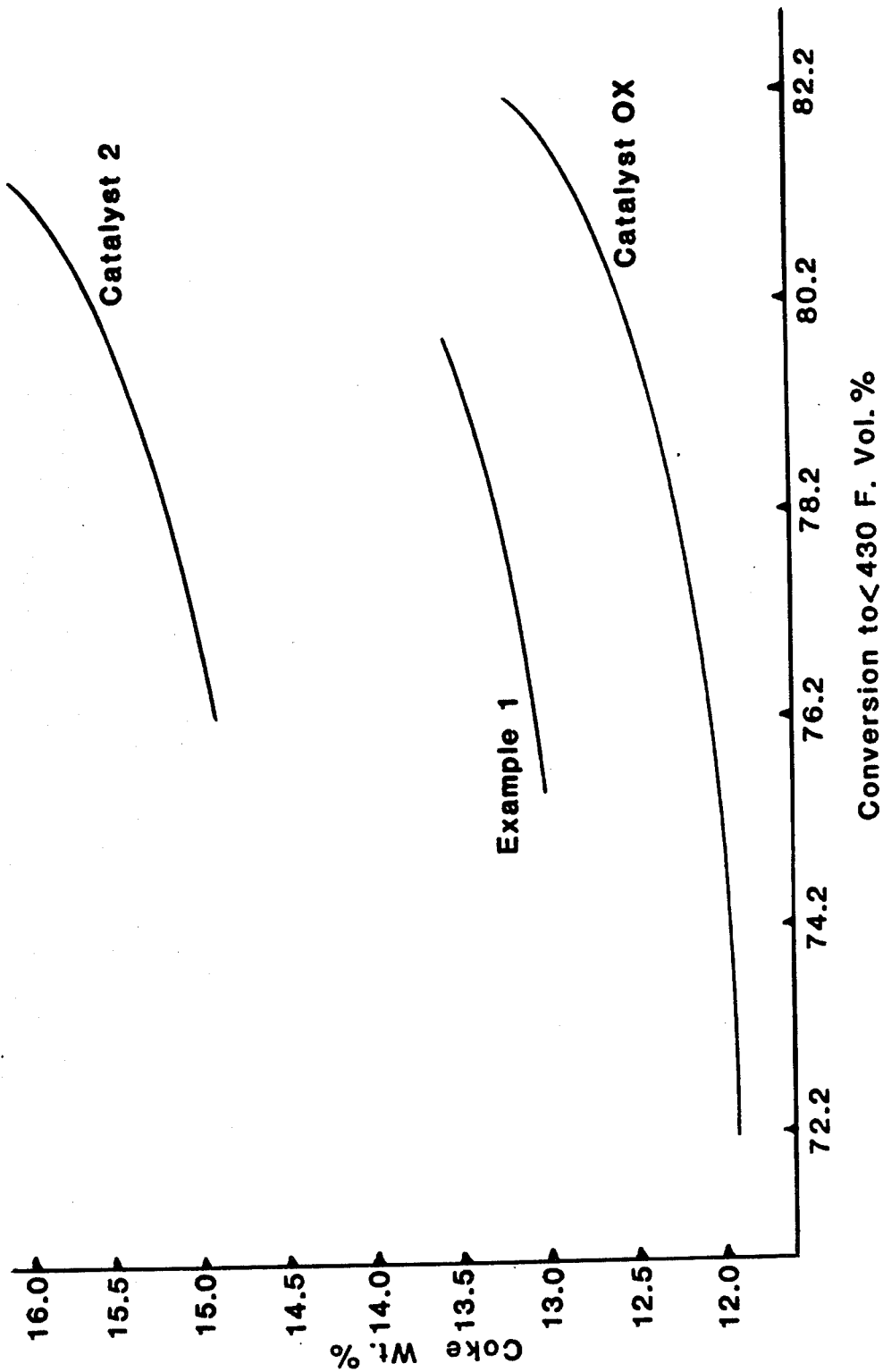
Figure 4:
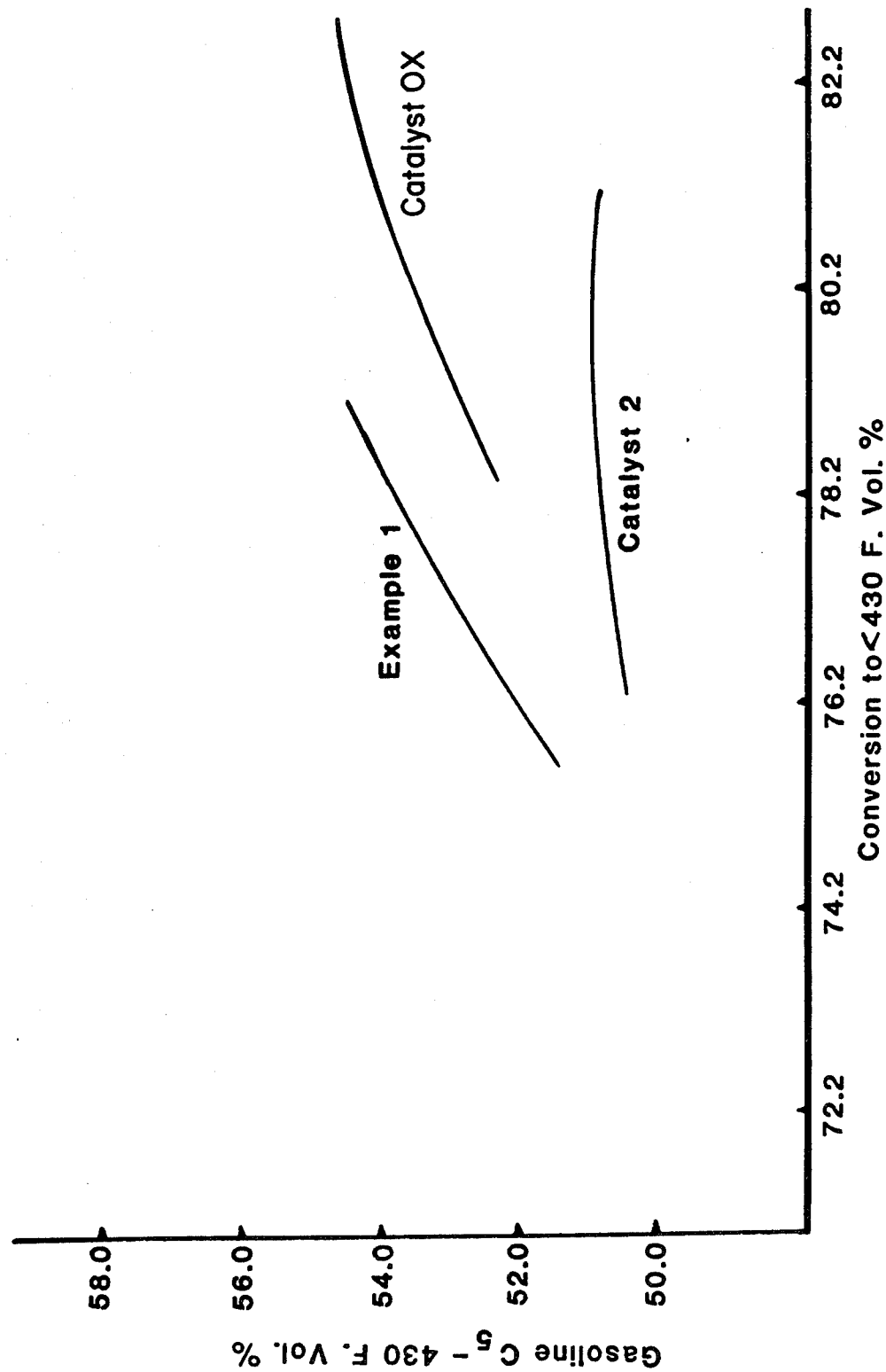
Figure 5:
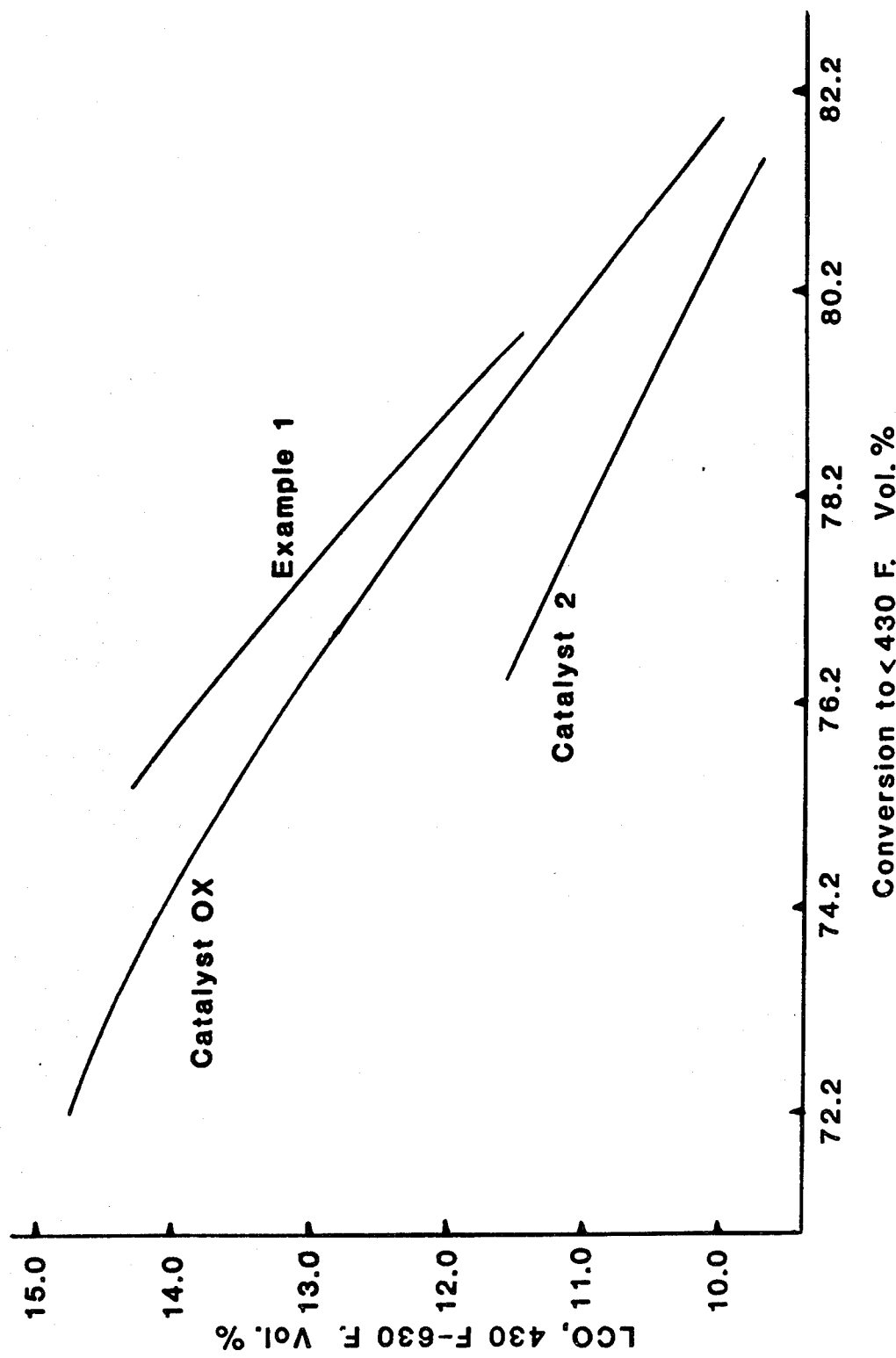
Figure 6:
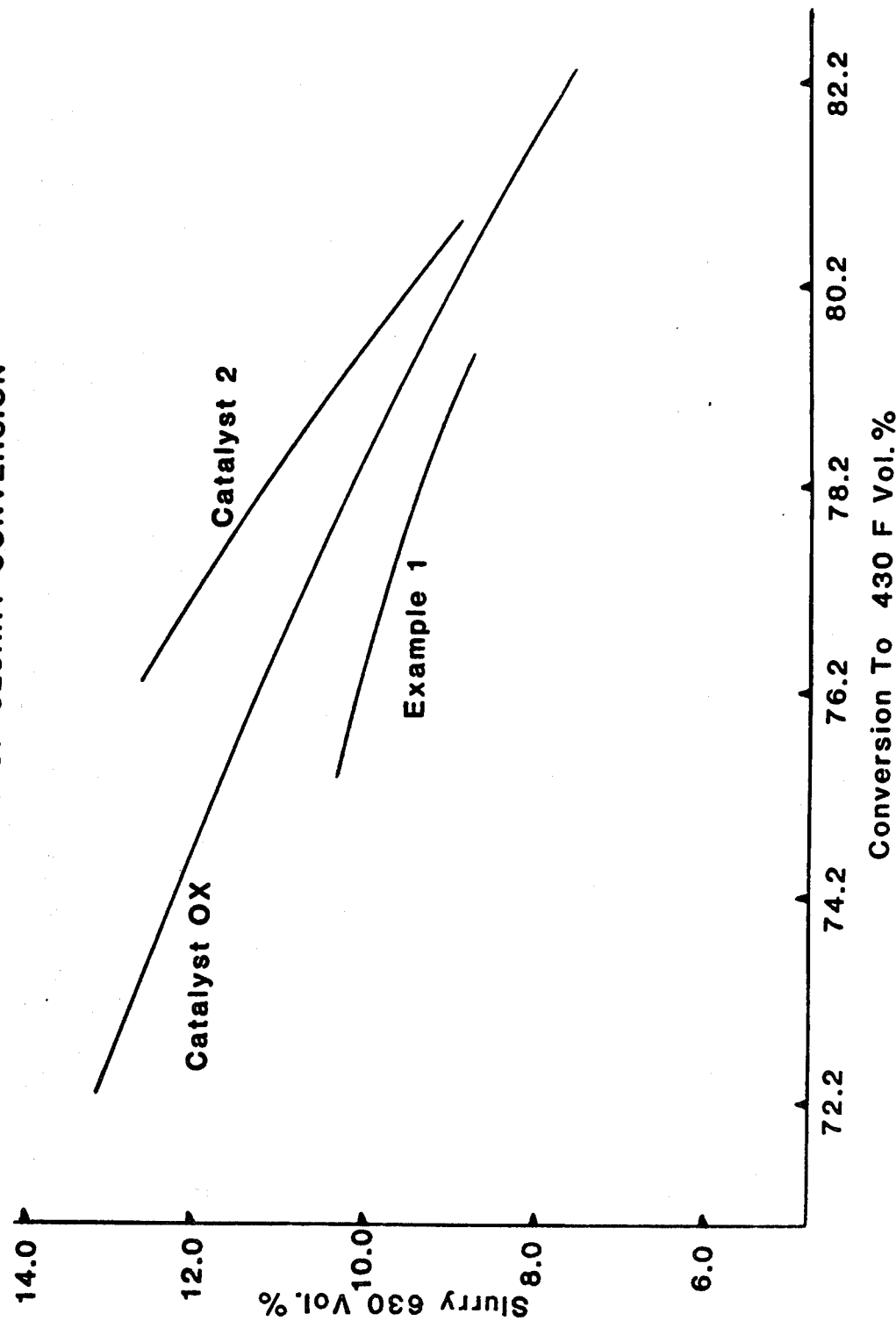
Figure 7:
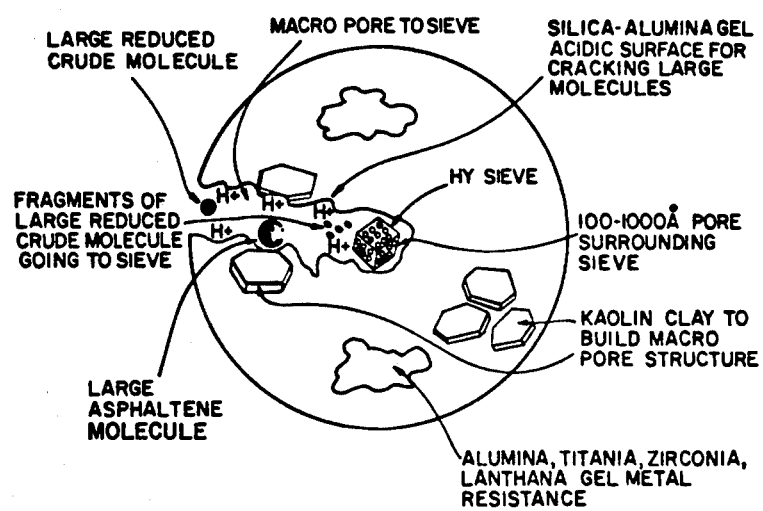
Figure 8:
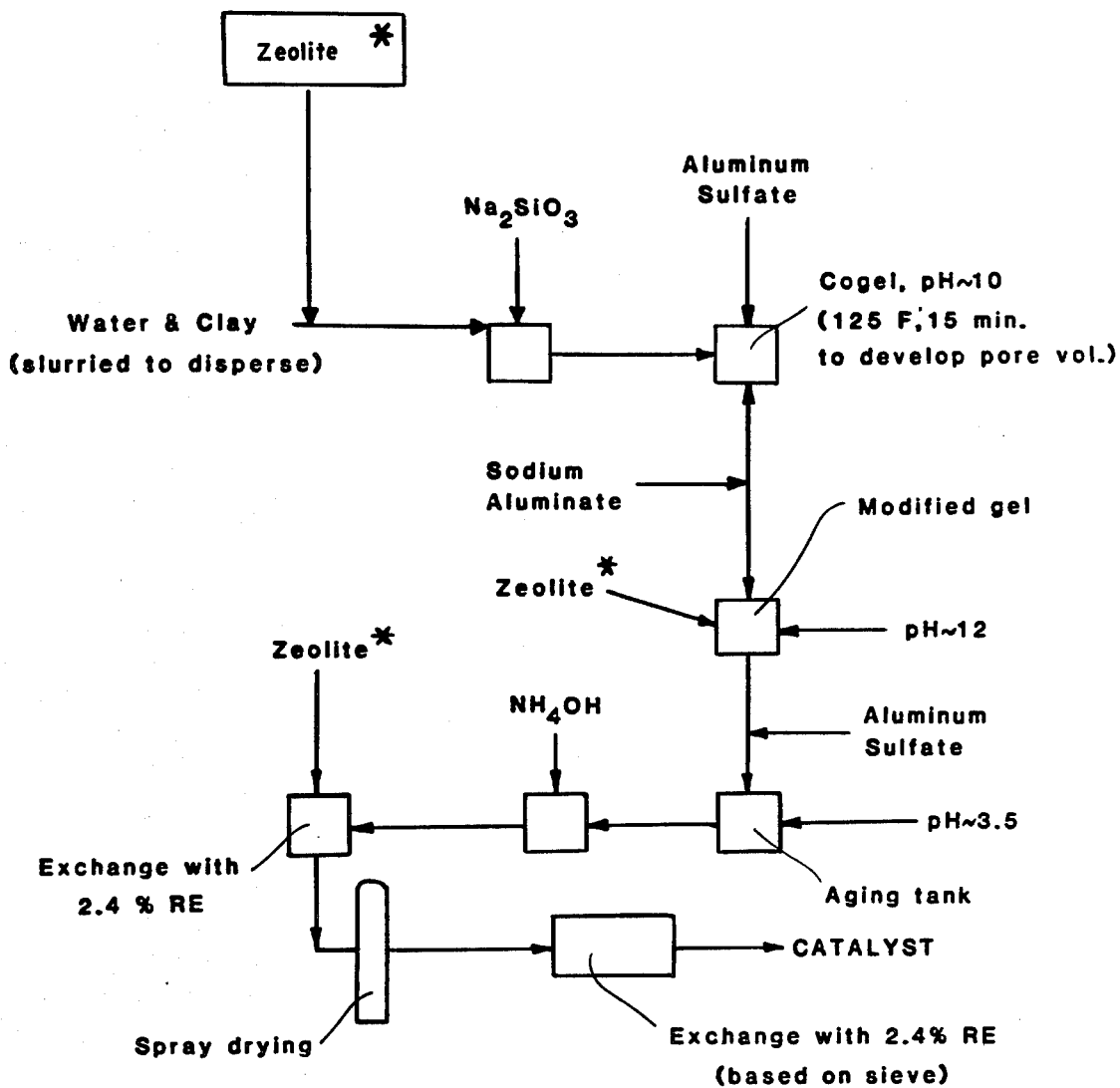
Figure 9:
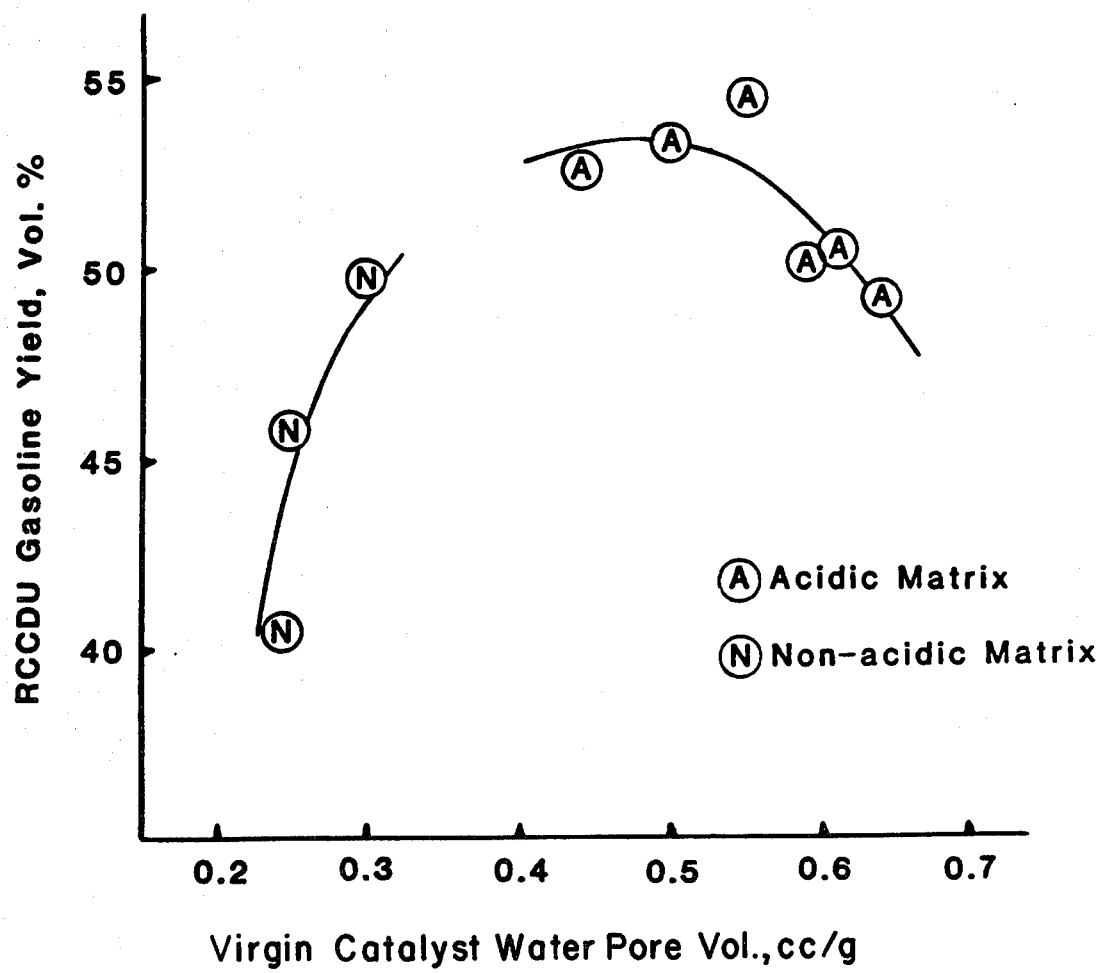

When the catalyst prepared according to Example 1 is contacted with the hydrocarbon feed of Table V in a process as described with respect to FIG. 2 of of U.S. Pat. No. 4,341,624 to Myers, the products obtained are as shown in Tables VI and VII. Similar other runs with catalysts results in products as shown in Tables VI, VII and VIII.

Modifications:

It should be understood that the invention is not to be limited by the examples which serve merely to illustrate certain preferred embodiments of the invention. The invention is susceptible to a wide variety of modifications and variations which will be evident to those skilled in the art upon reading of the present application. The above-mentioned references and related applications and the literature cited therein are incorporated herein by reference and many of the techniques taught therein will be found to be applicable to the invention. For example, conventional catalysts and/or sorbents can be mixed with the catalysts of the invention before they enter the reaction zone.

Sodium aluminate can replace 25 to 75% of the sodium silicate solution in the catalyst preparation process.

A small amount of rare earth can be added to the USY sieve to enhance acidity, activity, and metals resistance while controlling coke and C-like activity and reducing the production of hydrogen.

What is claimed is:

1. A low coke, high octane, high activity, high selectivity, metal tolerant, thermally stable, low slurry oil producing catalyst for the conversion of hydrocarbons contaminated with high Conradson carbon metals to produce lower molecular weight products, said catalyst comprising in combination:
   (a) from about 8 to about 25% by weight of a zeolite comprising a zeolite selected from the group consisting of a HY zeolite and an ultrastable HY zeolite having a silica-alumina mole ratio of at least about 5, and having a cell dimension of about 24.30 to about 24.70 angstroms;
   (b) from about 20 to about 70 wt. % of a clay comprising kaolin, having a crystalline size of from about 0.5 to about 2 microns;
   (c) from about 35 to about 70% of an acidic silica-alumina co-gel matrix comprising at least about 13 wt. % alumina;
   (d) from about 0.1 to about 3 wt. % of rare earths comprising lanthanum and cerium in a ratio of from about 1 to about 6;
   (e) from about 15 to about 60 wt. % alumina;
   (f) wherein said zeolite is partially exchanged with said rare earths from a solution and wherein said zeolite is contained in said acidic matrix and wherein rare earthes have been precipitated onto said matrix;

2. A catalyst composition as claimed in claim 1 comprising a pore volume greater than 0.4 cc per gram as determined by water titration.

3. A catalyst composition as claimed in claim 1 having from about 40 to 70% of all pores in the 100–1000 Å diameter range and less than 35% of all pores between 20–100 Å as measured by mercury porosimetry.

4. A catalyst composition as claimed in claim 1 containing at least 10% or more of all pores in the greater than 1000 Å range.

5. A catalyst composition as claimed in claim 1 comprising from about a ratio of 0.5 to 1.5 acidity in the matrix relative to the acidity in the zeolite.

6. A catalyst as claimed in claim 1 wherein the acidic silica-alumina co-gel matrix has an acidic component which is composed of one or more of the materials selected from the group consisting of an alumina coated silica gel, designated in the trade as low or high alumina; acid leached and alumina reprecipitated calcined kaolin or halloysite; synthetic montmorillonite, designated SMM; magnesium; titanium and zirconium promoted silica gels; and fluoride and phosophate promoted alumina gels.

7. A catalyst as claimed in claim 1 wherein the kaolin consists of a clay having 80% or more of the particles less than one micron.

8. A catalyst as claimed in claim 1 wherein the zeolite content is between 10 and 25% by weight.

9. A catalyst as claimed in claim 1 wherein the zeolite is an ultrastable HY zeolite.

10. A catalyst as claimed in claim 1 wherein the rare earth content is between 0.01 and 3% by weight.

11. A catalyst as claimed in claim 1 wherein at least 10% of the alumina is present as alumina gel.

12. A catalyst as claimed in claim 1 wherein 10 to 50% of the exchange sites on the HY zeolite or ultra stable HY zeolite are exchanged with rare earth, wherein the ratio of lanthanum to cerium is between 1 and 6.

13. A catalyst as claimed in claim 1 wherein 10 to 70% of the catalyst on the HY zeolite or ultra stable HY zeolite are exchanged with rare earth, wherein the ratio of lanthanum to cerium is between 3 and 6.

14. A catalyst as claimed in claim 1 wherein 25 to 75% of the total rare earth in the catalyst is precipitated in the matrix wherein the ratio of lanthanum to cerium is between 1 and 6.

15. A catalyst composition as claimed in claim 1 incorporating additional 10% of titania gel as a vanadia immobilizer.

16. A catalyst as claimed in claim 1 wherein 20% colloidal alumina is added in the catalyst during formation for nickel immobilization.

17. A catalyst as claimed in claim 1 wherein 1 to 5% of silicic acid is added to enhance attrition resistance.

18. A catalyst as claimed in claim 1 in which 20% carbon black is added during preparation in order to enhance micro pore structure.

19. A catalyst as claimed in claim 1 comprising a pore volume between 0.5 to 0.6 cc per gram.

20. A process for the preparation of the catalyst of claim 14 comprising in combination, the steps of:
   (a) adding a sodium silicate solution to a batch tank so as to yeild a concentration of 3 to 6% $SiO_2$;
   (b) dispersing kaolin clay in water in a concentration of 20 to 60% and combining with "a" in such proportions as to yield a catalyst containing 20 to 70% of kaolin;
   (c) adding a solution of alum to "b", so as to bring the pH to 8 to 10 and holding at 24° C. to 49° C. (75° F. to 120° F.) for ½ hour or more;
   (d) adding a sodium aluminate solution to "c" so as to raise the pH back to 12;
   (e) adding alum solution to "d" so as to drop the pH to 3;
   (f) adding a slurry of $NH_4$ HY zeolite to "e" so as to produce a final content of 8 to 35% zeolite in the finished catalyst, said HY zeolite to have been exchanged with rare earth to the extent of 10–80% of full rare earth capacity;
   (g) adding $NH_3$ to this slurry so as to neutralize the alum and return the pH to 6–9 by precipitating alumina gel;
   (h) dewatering "g" by filtration, homogenizing, adusting viscosity, and spray drying to a desirable particle size;
   (i) washing said spray dried particles to remove additional sodium and sulfate ions;
   (j) contacting with additional rare earth solution at a pH of about 5 so as to precipitate rare earth in the matrix;
   (k) rinsing, dewatering and drying to a final product.

21. A process as decribed in claim 20 in which the sodium silicate solution additionally comprises sodium aluminate solution in the catalyst preparation.

22. A process for catalyst preparation as described in claim 20 in which the sodium silicate solution is neutralized with sulfuric acid.

23. A process for the preparation of the catalyst of claim 1 comprising in combination, the steps of:

(a) adding a sodium silicate solution to a batch tank so as to yield a concentration of 3 to 6% SiO$_2$;
(b) dispersing kaolin clay in water in a concentration of 20 to 60% and combining with "a" in such proportions as to yield a catalyst containing 20 to 70% kaolin;
(c) adding a solution of alum to "b", so as to being the pH to 8 to 10 and holding at 24° C. to 49° C. (75° F. to 120° F.) for $\frac{2}{3}$ hour or more;
(d) adding a sodium aluminate solution to "c" so as to raise the pH back to 12;
(e) adding alum solution to "d" so as to drop the pH to 3;
(f) adding a slury of ultra stable HY zeolite to 37 e" so as to produce a final content of 8 to 35% zeolite in the finished catalyst, said HY zeolite being exchanged with rare earth to the extend of 10–80% of full rare earth capacity;
(g) adding NH$_3$ to this slurry so as to neutralize the alum and return the pH to 6–9 by precipitating alumina gel;
(h) dewatering "g" by filtration, homogenizing, adjusting viscosity, and spray drying to a desirable particle size;
(i) washing said spray dried particles to remove additional sodium and sulfate ions;
(j) contacting with additional rare earth solution at a pH of about 5 so as to precipitate rare earth onto the matrix;
(k) rinsing, dewatering and drying to a final product.

24. A process for the preparation of the catalyst of claim 14 comprising in combination, the steps of:
(a) adding a sodium silicate solution to a batch tank so as to yield a concentration of 3 to 6% SiO$_2$;
(b) dispersing kaolin clay in water in a concentration of 20 to 60% and combining with "a" in such proportions as to yield a catalyst containing 20 to 70% kaolin;
(c) adding a solution of alum to "b", so as to bring the pH to 8 to 10 and holding at 24° C. to 49° C. (75° F. to 120° F.) for $\frac{1}{2}$ hour or more;
(d) adding a sodium aluminate solution to "c" so as to raise the pH back to 12;
(e) adding to "d" an acid leached kaolin clay, which has been previously calcined, so as to drop the pH of "d" to 3;
(f) adding a slurry of ammonium HY zeolite to "e" so as to produce a final content of 8 to 35% zeolite in the finished catalyst, said HY zeolite being exchanged with rare earth to the extend of 10–80% of full rare earth capacity;
(g) adding NH$_3$ to this slurry so as to neutralize the alum and return the pH to 6–9 by precipitating alumina gel;
(h) dewatering "g" by filtration, homogenizing, adjusting viscosity; and spray drying to a desirable particle size;
(i) washing said spray dried particles to remove additional sodium and sulfate ions;
(j) contacting with additional rare earth solution at a pH of about 5 so as to precipitate rare earth onto the matrix;
(k) rinsing, dewatering and drying to a final product.

25. A process for the preparation of the catalyst of claim 1 comprising in combination, the steps of:
(a) adding a sodium silicate solution to a batch tank so as to yeild a concentration of 3 to 6% SiO$_2$;
(b) dispersing kaolin clay in water in a concentration of 20 to 60% and combining with "a" in such proportions as to yield a catalyst containing 20 to 70% kaolin;
(c) adding a solution of alum to "b", so as to bring the pH to 8 to 10 and holding at 24° C. to 49° C. (75° F. to 120° F.) for $\frac{1}{2}$ hour or more;
(d) adding a sodium aluminate solution to "c" so as to raise the pH back to 12;
(e) adding a reaction product of sulfuric acid with calcined kaolin or halloysite to "d" so as to drop the pH to 3;
(f) adding a slurry of partially rare earth exchanged ammonium HY zeolite to "e" so as to produce a final content of 8 to 35% by weight zeolite in the finished catalyst, wherein said rare earth is exchange to the extent of 10–80% of available exchange capacity;
(g) adding NH$_3$ to this slurry so as to neutralize the alum and return the pH to 6–9 by precipitating alumina gel;
(h) dewatering "h" by filtration, homogenizing, adjusting viscosity, and spray drying to a desirable particle size;
(i) washing said spray dried particles to remove additional sodium and sulfate ions;
(j) contacting with additional rare earth solution at a pH of about 5 so as to precipitate rare earth onto the matrix;
(k) rinsing, dewatering and drying to a final product.

26. The process of claim 20 in which the ammonium zeolite of "f" was obtained as a reaction product of the following sequence: washing a sodium Y zeolite with an ammonium ion solution to remove about 30 to about 60% of all sodium ions and treating the ammonium exchanged zeolite with a solution of rare earth chloride in a pressure reaction vessel for one to five hours at a temperature between about 121° C. to 232° C. (250° F. to 450° F.) so as to prepare an HY zeolite in which rare earth ion is caused to replace sodium in the sodalite cage of the ammonium Y zeolite.

27. A process for the preparation of the catalyst of claim 1 comprising in combination, the steps of:
(a) adding a sodium silicate solution to a batch tank so as to yield a concentration of 3 to 6% SiO$_2$;
(b) dispersing kaolin clay in water in a concentration of 20 to 60% and combining with "a" in such proportions as to yield a catalyst containing 20 to 70% kaolin;
(c) adding a solution of alum to "b", so as to bring the pH to 8 to 10 and holding at 24° C. to 49° C. (75° F. to 120° F.) for $\frac{1}{2}$ hour or more;
(d) adding a sodium aluminate solution to "c" so as to raise the pH back to 12;
(e) adding alum solution to "d" so as to drop the pH to 3;
(f) adding a slurry of partially rare earth exhanged ammonium HY zeolite to "e" so as to produce a final content of 8 to 35% by weight zeolite in the finished catalyst, wherein said rare earth is exchange to the extent of 10–80% of available exchange capacity;
(g) adding NH$_3$ to this slurry so as to neutralize the alum and return the pH to 6–9 by precipitating alumina gel;
(h) dewatering "g" by filtration, homogenizing, adjusting viscosity, and spray drying to a desirable particle size;

(i) washing said spray dried particles to remove additional sodium and sulfate ions;

(j) contacting with additional rare earth solution at a pH of about 5 so as to precipitate rare earth onto the matrix;

(k) rinsing, dewatering and drying to a final product

28. A process as claimed in claim 20 in which said HY zeolite has been exchanged with rare earth to the extent to 30-60% full rare earth capacity.

29. A catalyst composition as described in claim 11 in which the alumina gel is present as pseudoboehmite.

30. A process as described in claim 20 wherein each step in the process occurs in a batch tank in batch operations.

31. A process as described in claim 20 wherein each step in the process is carried out continuously from one tank to another so as to result in a continuous flow system.

* * * * *